US011976479B2

(12) United States Patent
Morijiri et al.

(10) Patent No.: US 11,976,479 B2
(45) Date of Patent: May 7, 2024

(54) BINDING MACHINE

(71) Applicant: MAX CO., LTD., Tokyo (JP)

(72) Inventors: Takeshi Morijiri, Tokyo (JP); Nobutaka Tashima, Tokyo (JP); Shinpei Sugihara, Tokyo (JP)

(73) Assignee: Max Co., Ltd., Tokyo (JP)

( * ) Notice: Subject to any disclaimer, the term of this patent is extended or adjusted under 35 U.S.C. 154(b) by 419 days.

(21) Appl. No.: 17/273,778

(22) PCT Filed: Sep. 5, 2019

(86) PCT No.: PCT/JP2019/035087
§ 371 (c)(1),
(2) Date: Mar. 5, 2021

(87) PCT Pub. No.: WO2020/050383
PCT Pub. Date: Mar. 12, 2020

(65) Prior Publication Data

US 2021/0317671 A1 Oct. 14, 2021

(30) Foreign Application Priority Data

Sep. 7, 2018 (JP) ................................ 2018-168248
Aug. 28, 2019 (JP) ................................ 2019-156057

(51) Int. Cl.
*E04G 21/12* (2006.01)
*B21F 15/04* (2006.01)
(Continued)

(52) U.S. Cl.
CPC ............ *E04G 21/123* (2013.01); *B21F 15/04* (2013.01); *B25B 25/00* (2013.01); *B65B 13/025* (2013.01); *B65B 13/04* (2013.01); *B65B 13/28* (2013.01)

(58) Field of Classification Search
CPC .......... B21F 15/00; B21F 15/02; B21F 15/04; B65B 13/22; B65B 13/28; B65B 13/285; B65B 13/025; B25B 25/00; E04G 21/123
See application file for complete search history.

(56) References Cited

U.S. PATENT DOCUMENTS 5,694,983 A 12/1997 Kusakari et al.
5,944,064 A * 8/1999 Saito ..................... E04G 21/122 140/57

(Continued)

FOREIGN PATENT DOCUMENTS

CL 2000002790 A1 8/2000
CL 2017003252 A1 6/2018

(Continued)

OTHER PUBLICATIONS

Translation of JP-3050367-B2 (JPH08246675A) (Year: 1996).*

(Continued)

*Primary Examiner* — Bobby Yeonjin Kim
(74) *Attorney, Agent, or Firm* — Banner & Witcoff, Ltd.

(57) ABSTRACT

A binding machine includes a body part, a feeding unit configured to feed a wire, a first guide extending in a first direction from an end portion on one side of the body part, configured to guide the wire fed by the feeding unit, and having a first induction part provided on a tip end-side in the first direction, a second guide spaced from the first guide with an interval, in which a binding object is inserted, in a second direction orthogonal to the first direction, and configured to guide the wire fed by the feeding unit, and a twisting unit configured to twist the wire. The first induction part is constituted by a surface inclined in a direction in which the interval between the first guide and the second guide decreases from a tip end-side toward a base end-side of the first induction part in the first direction.

11 Claims, 20 Drawing Sheets

(51) Int. Cl.

| | |
|---|---|
| ***B25B 25/00*** | (2006.01) |
| ***B65B 13/02*** | (2006.01) |
| ***B65B 13/28*** | (2006.01) |
| *B65B 13/04* | (2006.01) |

(56) References Cited

U.S. PATENT DOCUMENTS

| | | | |
|---|---|---|---|
| 2006/0157139 | A1 | 7/2006 | Hoyaukin |
| 2006/0254666 | A1 | 11/2006 | Kusakari et al. |
| 2009/0283168 | A1 | 11/2009 | Kusakari |
| 2010/0147411 | A1 | 6/2010 | Kusakari et al. |
| 2014/0246114 | A1 | 9/2014 | Kusakari et al. |
| 2015/0267423 | A1 | 9/2015 | Kusakari et al. |
| 2016/0222683 | A1 | 8/2016 | Kusakari et al. |
| 2018/0126443 | A1 | 5/2018 | Morijiri et al. |
| 2018/0155940 | A1 | 6/2018 | Nagaoka et al. |
| 2018/0161848 | A1 | 6/2018 | Itagaki et al. |
| 2018/0195299 | A1 | 7/2018 | Itagaki |
| 2018/0363309 | A1 | 12/2018 | Kusakari et al. |
| 2020/0399914 | A1 | 12/2020 | Nagaoka et al. |
| 2021/0114080 | A1 | 4/2021 | Itagaki et al. |
| 2021/0138527 | A1 | 5/2021 | Itagaki et al. |
| 2021/0189746 | A1 | 6/2021 | Itagaki |
| 2021/0197248 | A1 | 7/2021 | Morijiri et al. |
| 2021/0237143 | A1 | 8/2021 | Morijiri et al. |
| 2021/0245904 | A1 | 8/2021 | Itagaki et al. |
| 2021/0245906 | A1 | 8/2021 | Morimura et al. |
| 2021/0316428 | A1 | 10/2021 | Morijiri et al. |
| 2021/0317671 | A1 | 10/2021 | Morijiri et al. |
| 2021/0339896 | A1 | 11/2021 | Morijiri et al. |
| 2021/0340781 | A1 | 11/2021 | Morijiri et al. |
| 2021/0396028 | A1 | 12/2021 | Morijiri et al. |

FOREIGN PATENT DOCUMENTS

| | | | | | |
|---|---|---|---|---|---|
| CL | 2017003254 | A1 | | 6/2018 | |
| CL | 2021000560 | A1 | | 9/2021 | |
| CL | 2021000358 | A1 | | 10/2021 | |
| EP | 0731238 | A1 | | 9/1996 | |
| EP | 1418124 | A1 | | 5/2004 | |
| EP | 1418124 | A1 | * | 5/2004 | ............ B65B 13/02 |
| EP | 3321450 | A1 | | 5/2018 | |
| JP | H06-167115 | A | | 6/1994 | |
| JP | H08-246675 | A | | 9/1996 | |
| JP | H08-277632 | A | | 10/1996 | |
| JP | 2731812 | B2 | | 3/1998 | |
| JP | 3050367 | B2 | * | 6/2000 | ........... E04G 21/122 |
| JP | 2006-520865 | A | | 9/2006 | |
| JP | 5126101 | B2 | | 11/2012 | |
| JP | 2018-76106 | A | | 5/2018 | |
| RU | 2518167 | C2 | | 6/2014 | |
| TW | 200827518 | A | | 7/2008 | |
| TW | I333013 | B | | 11/2010 | |
| TW | 201718346 | A | | 6/2017 | |
| WO | 2005/021893 | A1 | | 3/2005 | |
| WO | WO-2017014270 | A1 | * | 1/2017 | .............. B21F 15/06 |

OTHER PUBLICATIONS

Translation of WO-2017014270 (Year: 2017).*

Chilean Office Action dated Jan. 3, 2022, issued in the corresponding Chilean Patent No. CL-OA 00560-2021. (with partial English translation) (15 pages).

Extended European Search Report dated May 10, 2022, issued by the European Patent Office in the corresponding European Patent Application No. 19857575.5. (7 pages).

Russian Office Action dated Nov. 18, 2022, issued by the Federal Service for Intellectual Property in the corresponding Russian Patent Application No. 2021105541, with English translation. (12 pages).

International Search Report issued in Application No. PCT/JP2019/035087 dated Nov. 26, 2019, 5 pages.

Sep. 12, 2023—(VN) Office Action—VN App 1-2021-01164, Eng Tran.

Mar. 9, 2021—(WO) IPRP—PCT/JP2019/035093, Eng Tran.

* cited by examiner

BINDING MACHINE

CROSS REFERENCE TO RELATED APPLICATION

This application is a 35 U.S.C. 371 National Phase Entry Application from PCT/JP2019/035087, filed Sep. 5, 2019, which claims priority to Japanese Patent Application Nos. 2018-168248, filed Sep. 7, 2018, and 2019-156057, filed Aug. 28, 2019, the disclosures of which are incorporated herein in their entirety by reference, and priority is claimed to each of the foregoing.

TECHNICAL FIELD

The present disclosure relates to a binding machine configured to bind a binding object such as a reinforcing bar and the like with a wire.

BACKGROUND ART

In the related art, suggested is a binding machine referred to as a reinforcing bar binding machine configured to pull out a wire from a wire reel mounted to a binding machine body, to feed the wire to a guide part provided at a tip end of the binding machine body, and to wind and bind the wire around reinforcing bars arranged on an inner side of the guide part (for example, refer to PTL 1).

The binding machine disclosed in PTL 1 has a lower guide provided with a predetermined interval from the guide part and is configured to perform a binding operation with the reinforcing bars being inserted between the guide part and the lower guide.

CITATION LIST

Patent Literature

[PTL 1] Japanese Patent No. 5,126,101

SUMMARY OF INVENTION

Technical Problem

In the binding machine disclosed in PTL 1, while inserting the reinforcing bars between the guide part and the lower guide, there is a possibility that the reinforcing bars cannot be inserted between the guide part and the lower guide, when the reinforcing bars are butted against a tip end of the guide part. An operator should securely insert the reinforcing bars between the guide part and the lower guide, so that it takes to perform an operation.

The present disclosure has been made in view of the above situations, and an object thereof is to provide a binding machine configured so that reinforcing bars can be easily inserted between a pair of guides.

Solution to Problem

In order to achieve the above object, a binding machine of the present disclosure includes a body part; a feeding unit configured to feed a wire; a first guide extending in a first direction from an end portion on one side of the body part, configured to guide the wire fed by the feeding unit, and having a first induction part provided on a tip end-side in the first direction; a second guide spaced from the first guide with an interval, in which a binding object is inserted, in a second direction orthogonal to the first direction, and configured to guide the wire fed by the feeding unit; and a twisting unit configured to twist the wire guided by the first guide and the second guide, wherein the first induction part is constituted by a surface inclined in a direction in which the interval between the first guide and the second guide decreases from a tip end-side toward a base end-side of the first induction part in the first direction.

In the binding machine, the first induction part is constituted by the surface inclined in the direction in which the interval between the first guide and the second guide decreases from the tip end-side toward the base end-side. Therefore, when the binding object is butted against the first induction part, the binding object is guided in the direction between the first guide and the second guide.

Advantageous Effects of Invention

According to the binding machine of the present disclosure, the binding object can be easily inserted between the first guide and the second guide, which reduces the time necessary for an operation.

DESCRIPTION OF EMBODIMENTS

Hereinbelow, examples of the reinforcing bar binding machine as embodiments of the binding machine of the present invention will be described with reference to the drawings.

<Example of Reinforcing Bar Binding Machine of First Embodiment>

Figure 1:
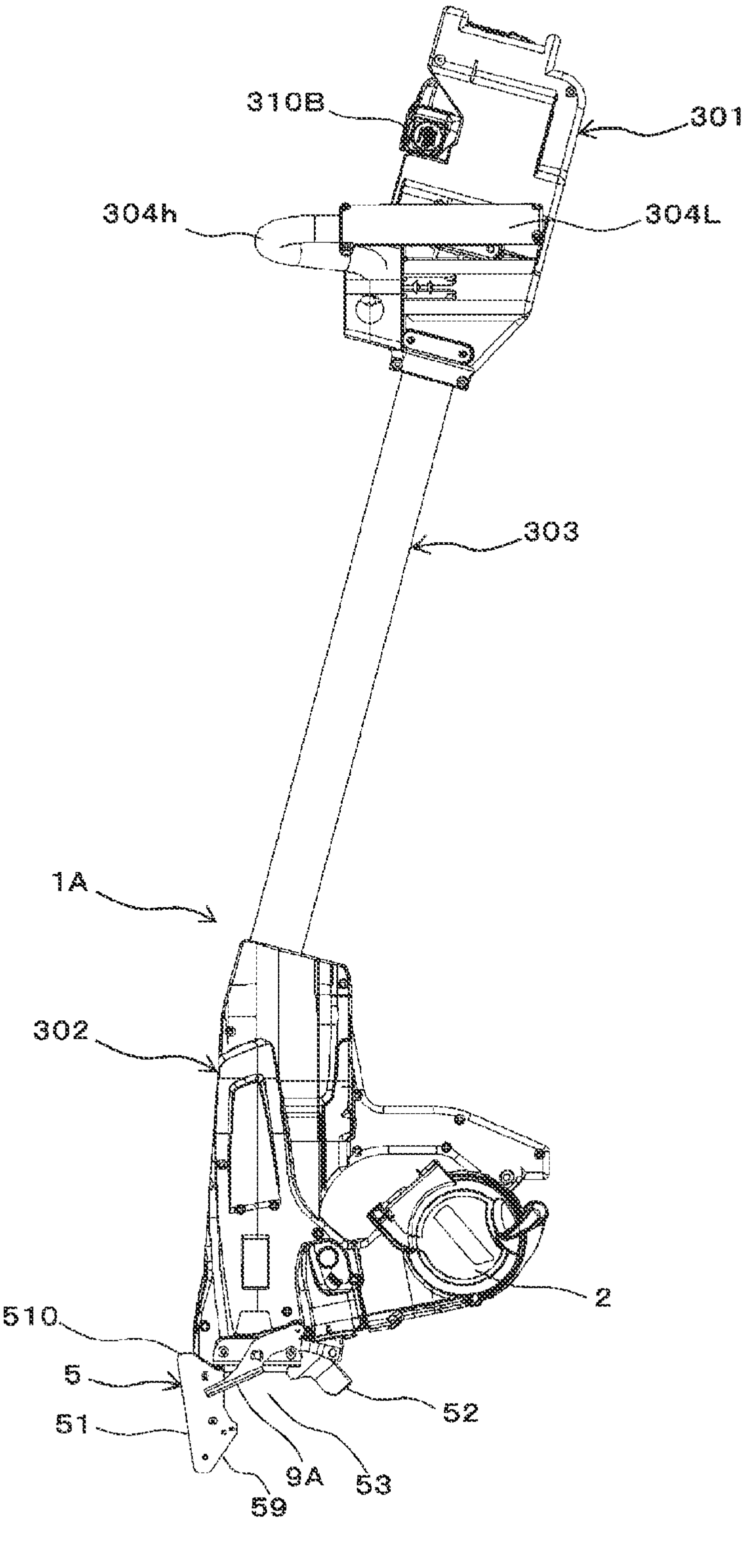
FIG. 1 is a side view depicting an example of an overall configuration of a reinforcing bar binding machine of a first embodiment.
Figure 2:
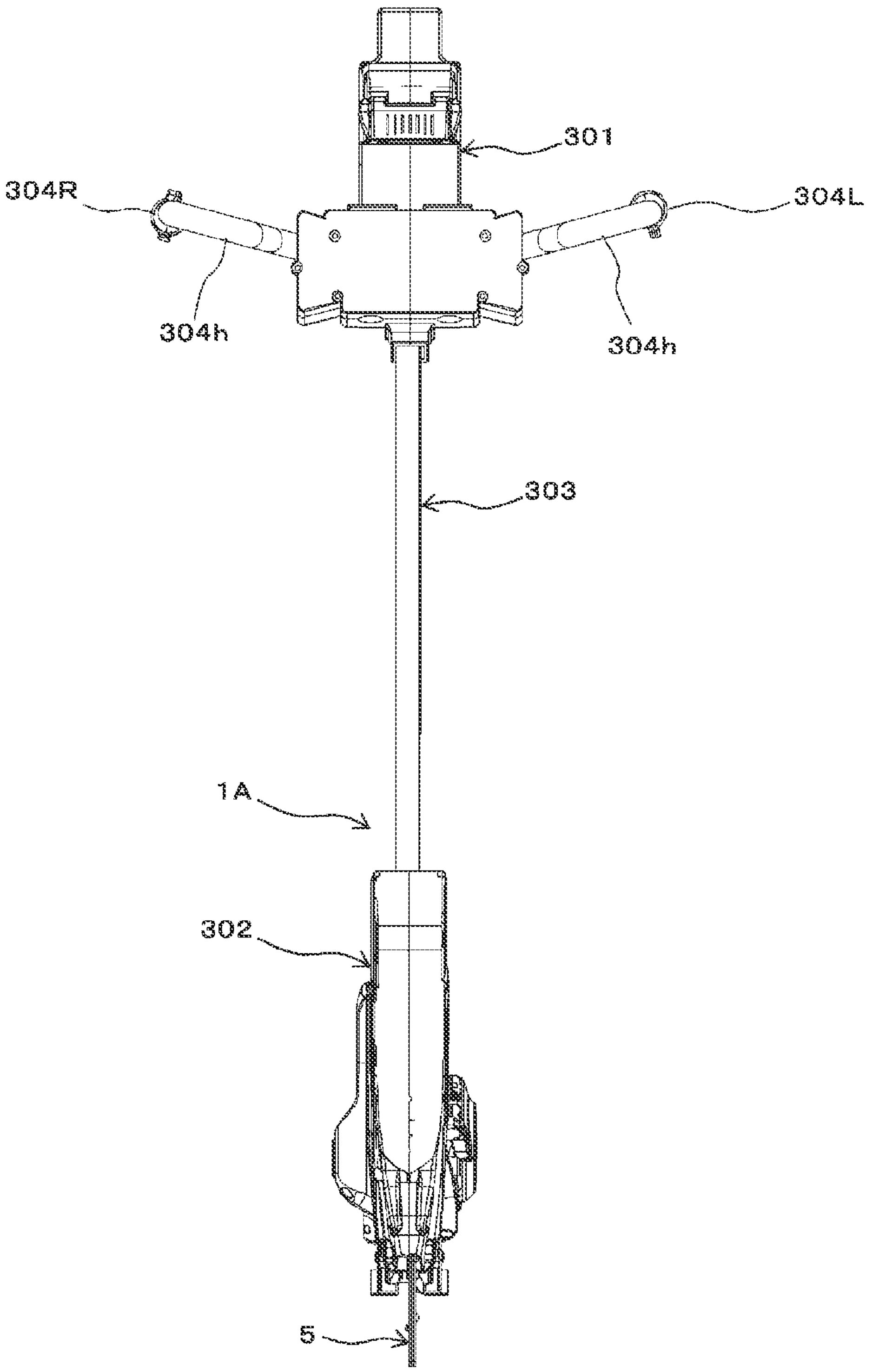
FIG. 2 is a top view depicting the example of the overall configuration of the reinforcing bar binding machine of the first embodiment.
Figure 3:
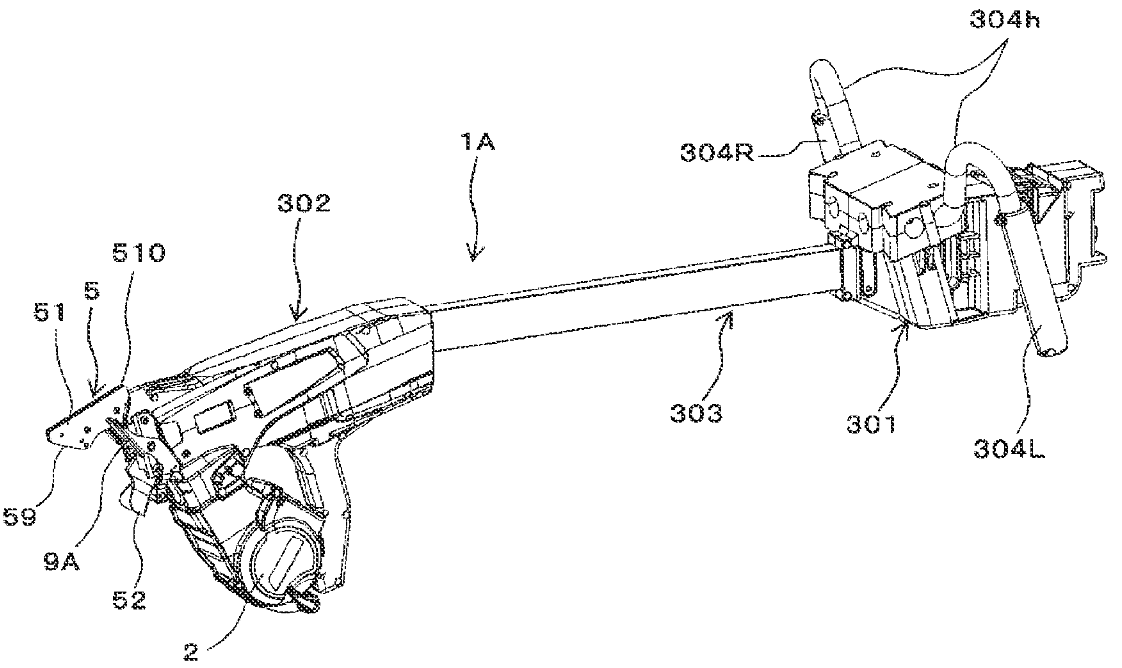
FIG. 3 is a perspective view depicting the example of the overall configuration of the reinforcing bar binding machine of the first embodiment.
Figure 4:
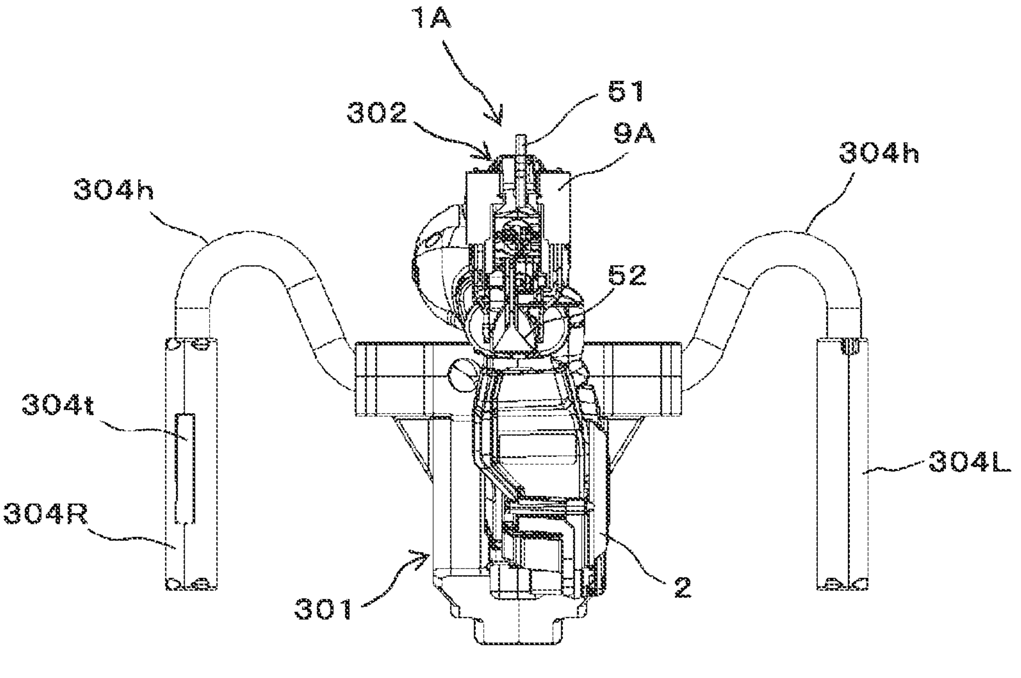
FIG. 4 is a front view depicting the example of the overall configuration of the reinforcing bar binding machine of the first embodiment.

FIG. 1 is a side view depicting an example of an overall configuration of a reinforcing bar binding machine of a first embodiment, FIG. 2 is a top view depicting the example of the overall configuration of the reinforcing bar binding machine of the first embodiment, FIG. 3 is a perspective view depicting the example of the overall configuration of the reinforcing bar binding machine of the first embodiment, and FIG. 4 is a front view depicting the example of the overall configuration of the reinforcing bar binding machine of the first embodiment.

A reinforcing bar binding machine 1A of the first embodiment includes a first body part 301, a second body part 302, and an elongated connecting part 303 configured to connect the first body part 301 and the second body part 302. The first body part 301 has a handle part 304*h* having a pair of grip parts 304L and 304R that can be grasped by an operator. A battery 310B is mounted to the first body part 301.

Figure 5:
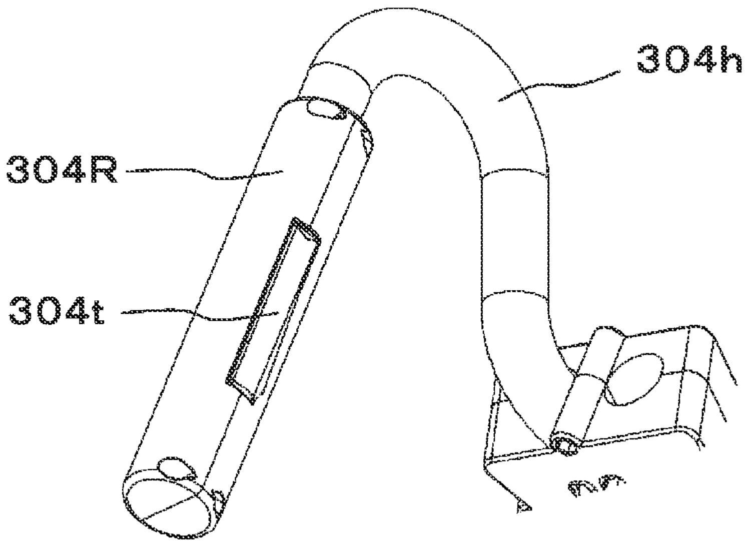
FIG. 5 is a perspective view depicting an example of a grip part.

FIG. 5 is a perspective view depicting an example of the grip part. The handle part 304*h* has an operation part 304*t* provided to the grip part 304R that is mainly grasped with a right hand. The operation part 304*t* is attached to the grip part 304R so as to be rotatable about a shaft (not shown) as a support point, and protrudes from a surface of the grip part 304R. The operation part 304*t* is grasped together with the grip part 304R by the operator, so that it is rotated with respect to the grip part 304R and is thus actuated. The reinforcing bar binding machine 1A includes an output unit configured to perform a predetermined output as the operation part 304*t* is actuated, and provided in the grip part 304R. The output unit configured to perform a predetermined output as the operation part 304*t* is actuated is referred to as a first output unit, which will be described later.

Figure 6:
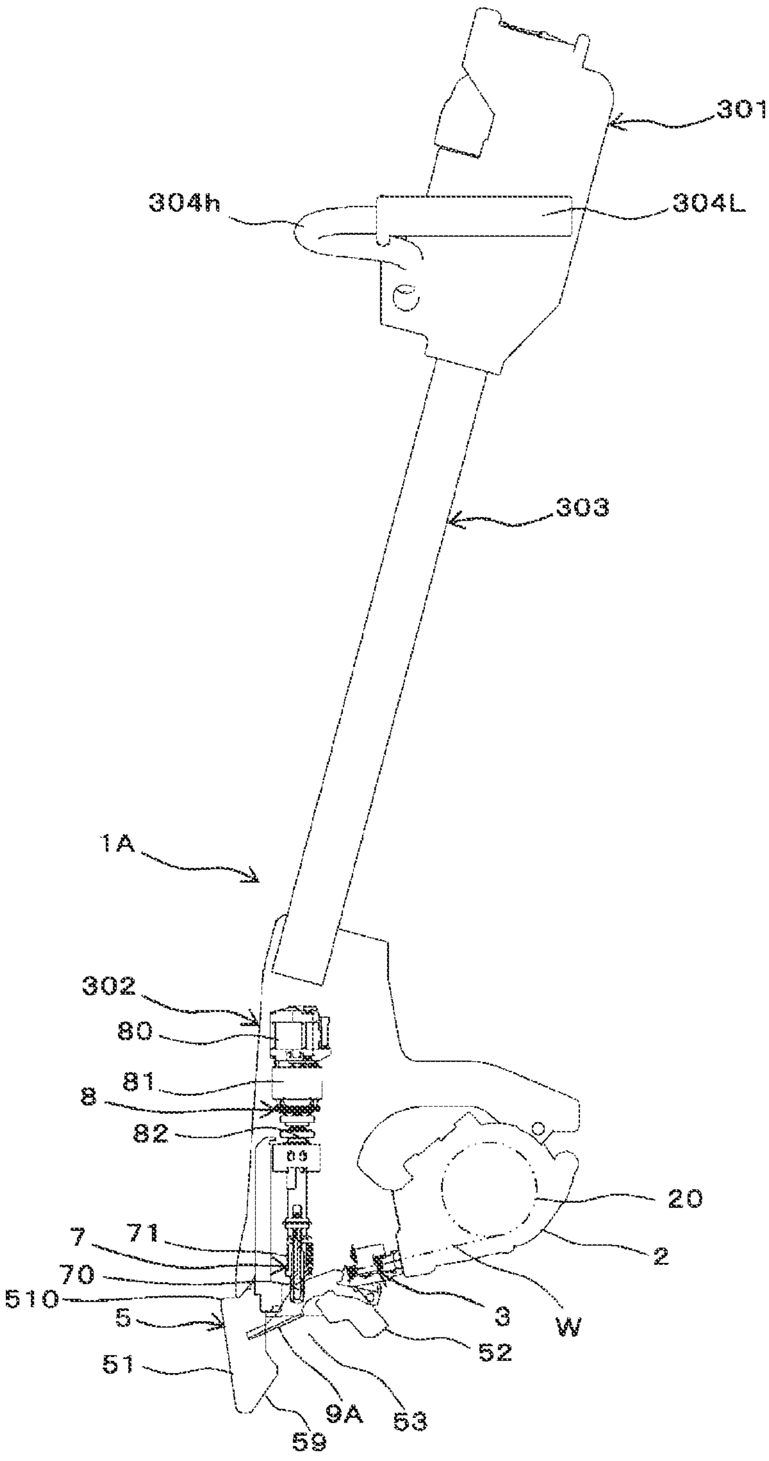
FIG. 6 is a side view depicting an example of an internal configuration of the reinforcing bar binding machine of the first embodiment.
Figure 7:
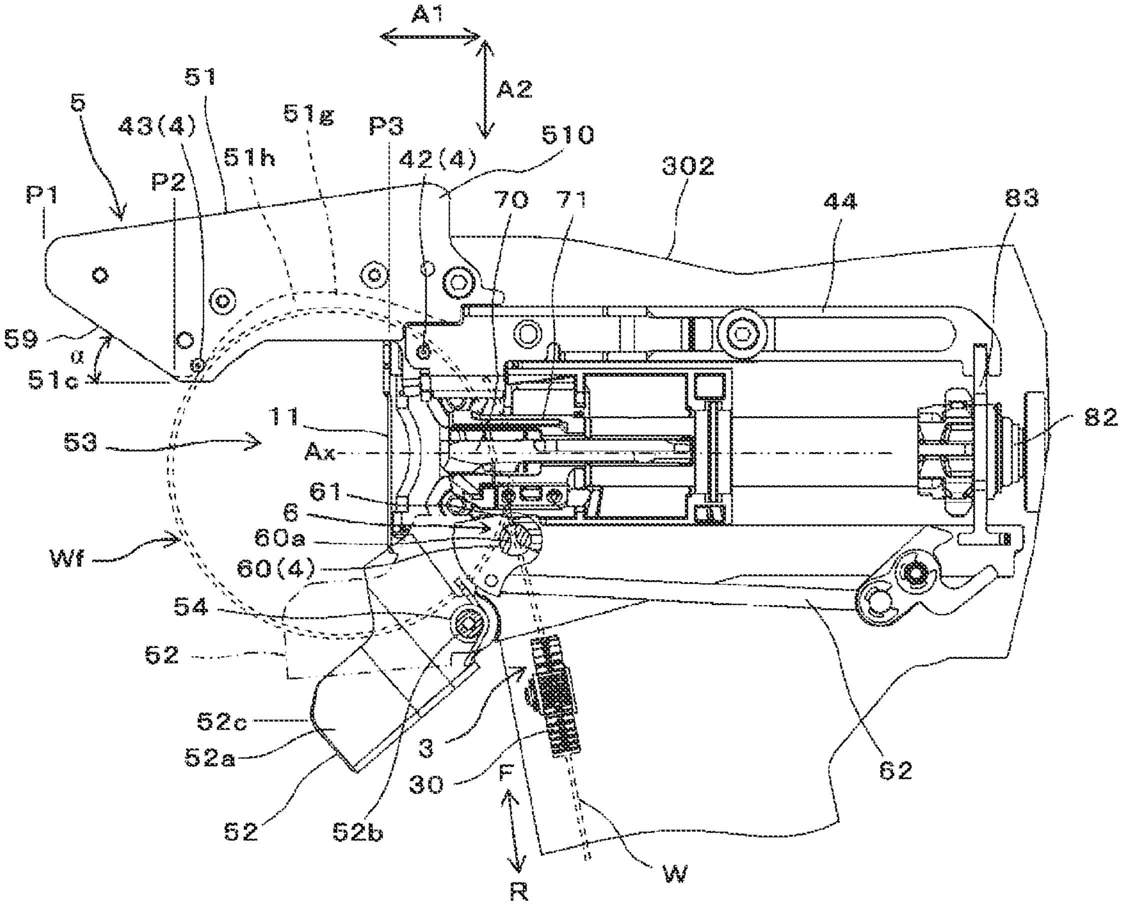
FIG. 7 is a side view depicting main parts of the internal configuration of the reinforcing bar binding machine of the first embodiment.

FIG. 6 is a side view depicting an example of an internal configuration of the reinforcing bar binding machine of the first embodiment, and FIG. 7 is a side view depicting main parts of the internal configuration of the reinforcing bar binding machine of the first embodiment.

The second body part 302 has an accommodation part 2 configured to rotatably accommodate a wire reel 20 on which the wire W is wound, and a feeding unit 3 configured to feed the wire W wound on the wire reel 20 accommodated in the accommodation part 2. The second body part 302 also has a regulation part 4 configured to curl the wire W fed by the feeding unit 3, and a guide part 5 configured to guide the wire W curled by the regulation part 4 to a surrounding of reinforcing bars S, which are a binding object. The second body part 302 also has a cutting unit 6 configured to cut the wire W, a twisting unit 7 configured to twist the wire W, and a drive unit 8 configured to drive the cutting unit 6, the twisting unit 7, and the like.

In the reinforcing bar binding machine 1A, the guide part 5 is provided on one side of the second body part 302. In the present embodiment, the side on which the guide part 5 is provided is defined as the front. In the reinforcing bar binding machine 1A, the first body part 301 and the second body part 302 are connected by the connecting part 303, so that the guide part 5 and the handle part 304*h* are extended therebetween, as compared to a reinforcing bar binding machine with no connecting part 303.

The accommodation part 2 is configured so that the wire reel 20 can be attached/detached and supported. The feeding unit 3 has a pair of feeding gears 30 as a feeding member. When a motor (not shown) rotates the feeding gears 30 in a state where the wire W is sandwiched between the pair of feeding gears 30, the feeding unit 3 feeds the wire W. The feeding unit 3 can feed the wire W in a forward direction denoted with an arrow F and in a reverse direction denoted with an arrow R, according to a rotating direction of the feeding gears 30.

The cutting unit 6 is provided downstream of the feeding unit 3 with respect to the feeding of the wire W in the forward direction denoted with the arrow F. The cutting unit 6 has a fixed blade part 60, and a movable blade part 61 configured to cut the wire W in cooperation with the fixed blade part 60. The cutting unit 6 also has a transmission mechanism 62 configured to transmit motion of the drive unit 8 to the movable blade part 61.

The fixed blade part 60 has an opening 60*a* through which the wire W passes. The movable blade part 61 is configured to cut the wire W passing through the opening 60*a* of the fixed blade part 60 by a rotating operation about the fixed blade part 60 as a support point.

The regulation part 4 has a first regulation member to a third regulation member in contact with the wire W at a plurality of parts, in the present example, at least three places in a feeding direction of the wire W fed by the feeding unit 3, thereby curling the wire W along a feeding path Wf of the wire W shown with the broken line in FIG. 7.

The first regulation member of the regulation part 4 is constituted by the fixed blade part 60. The regulation part 4 also has a regulation member 42 as the second regulation member provided downstream of the fixed blade part 60 with respect to the feeding of the wire W in the forward direction denoted with the arrow F, and a regulation member 43 as the third regulation member provided downstream of the regulation member 42. The regulation member 42 and the regulation member 43 are each constituted by a cylindrical member, and the wire W is in contact with outer peripheral surfaces thereof.

In the regulation part 4, the fixed blade part 60, the regulation member 42 and the regulation member 43 are arranged on a curve in conformity to the spiral feeding path Wf of the wire W. The opening 60*a* of the fixed blade part 60 through which the wire W passes is provided on the feeding path Wf of the wire W. The regulation member 42 is provided on a diametrically inner side with respect to the feeding path Wf of the wire W. The regulation member 43 is provided on a diametrically outer side with respect to the feeding path Wf of the wire W.

Thereby, the wire W fed by the feeding unit 3 passes in contact with the fixed blade part 60, the regulation member 42 and the regulation member 43, so that the wire W is curled to follow the feeding path Wf of the wire W.

The regulation part 4 has a transmission mechanism 44 configured to transmit motion of the drive unit 8 to the regulation member 42. In operations of feeding the wire W in the forward direction by the feeding unit 3 and curling the wire W, the regulation member 42 is configured to move to a position at which it contacts the wire W, and in operations of feeding the wire W in the reverse direction and winding the wire W on the reinforcing bars S, the regulation member 42 is configured to move to a position at which it does not contact the wire W.

Figure 8A:
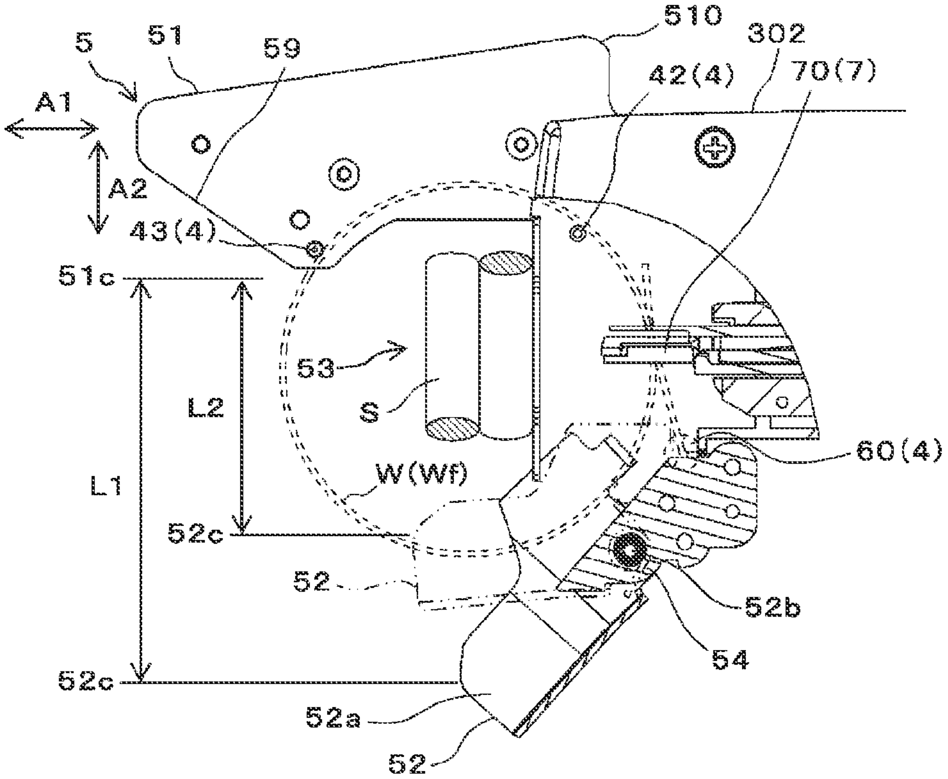
FIG. 8A is a side view depicting an example of a guide part.
Figure 8B:
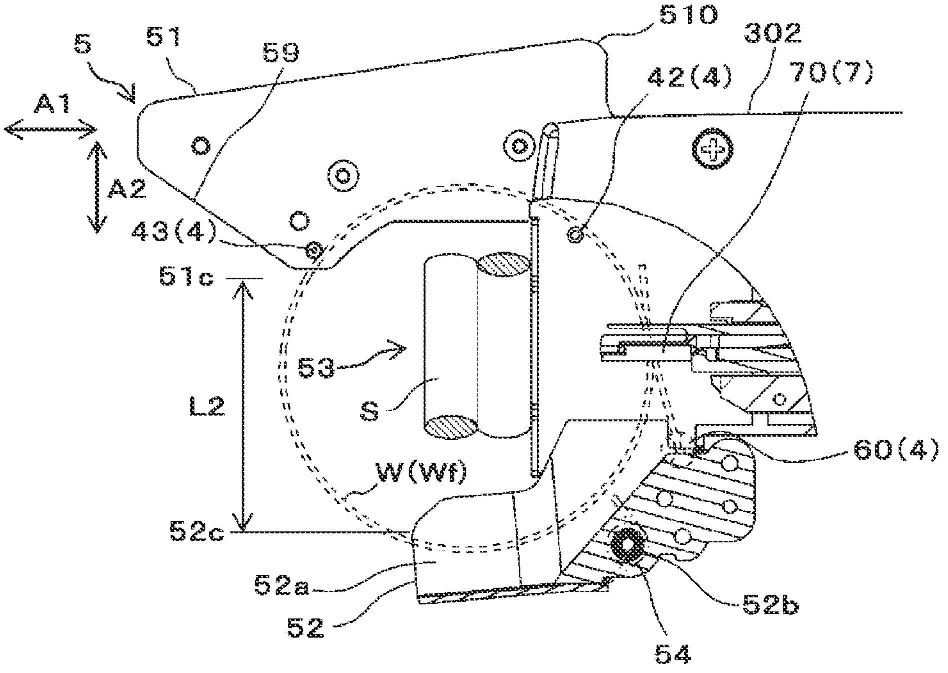
FIG. 8B is a side view depicting the example of the guide part.
Figure 9:
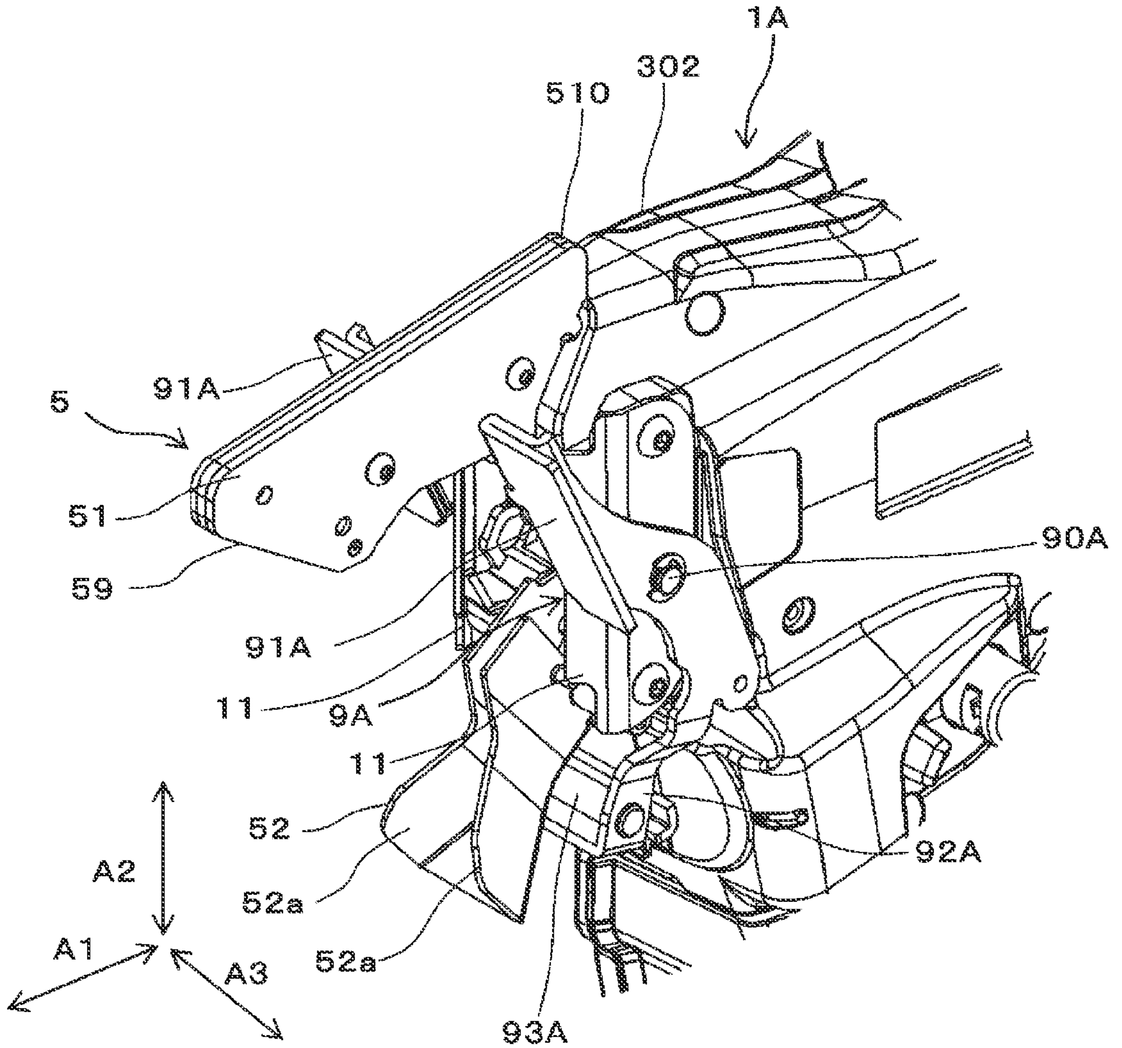
FIG. 9 is a perspective view depicting an example of the guide part and a contact member.
Figure 10A:
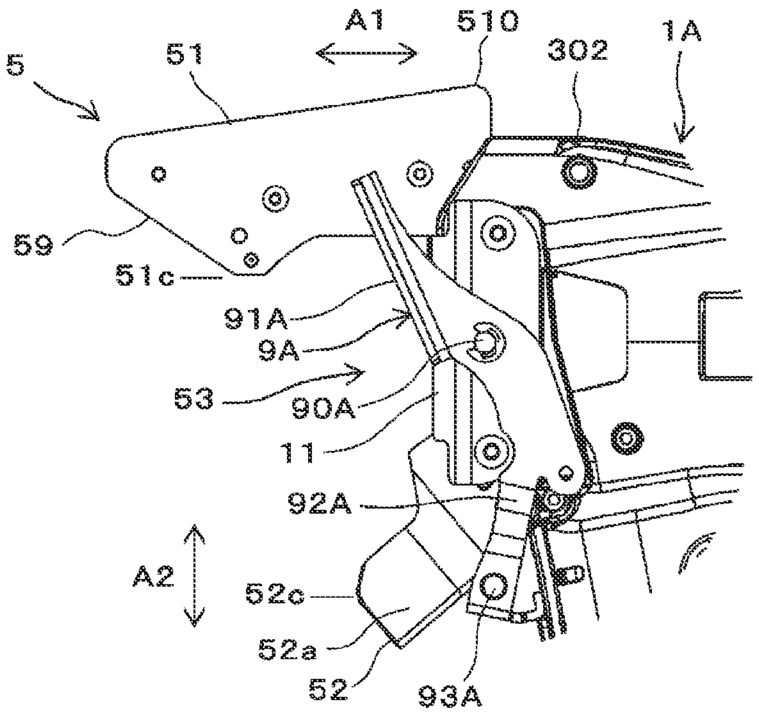
FIG. 10A is a side view depicting an example of the contact member.
Figure 10B:
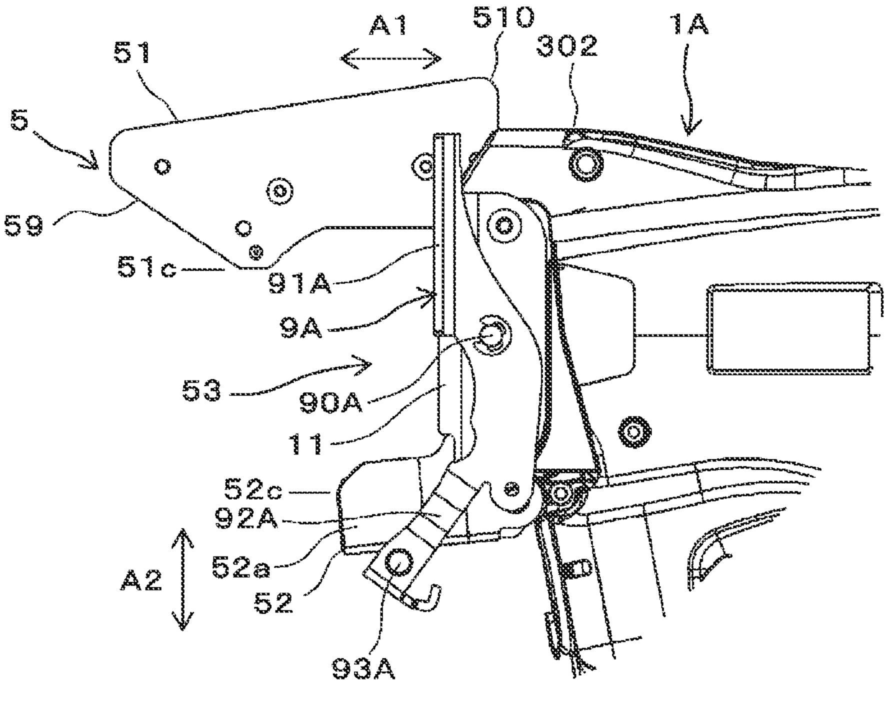
FIG. 10B is a side view depicting the example of the contact member.

FIGS. 8A and 8B are side views depicting an example of the guide part, FIG. 9 is a perspective view depicting an example of the guide part and a contact member, and FIGS. 10A and 10B are side views depicting an example of the contact member. In the below, a configuration of actuating a pair of guides and operational effects are described.

The guide part 5 has a first guide 51 provided with the regulation member 43 of the regulation part 4, and a second guide 52 configured to guide the wire W curled by the regulation part 4 and the first guide 51 to the twisting unit 7.

The first guide 51 is attached to an end portion on a front side of the second body part 302, and extends in a first direction denoted with an arrow A1. As shown in FIG. 7, the first guide 51 has a groove portion 51*h* having a guide surface 51*g* with which the wire W fed by the feeding unit 3 is in sliding contact. As for the first guide 51, when a side attached to the second body part 302 is referred to as a base end-side and a side extending in the first direction from the second body part 302 is referred to as a tip end-side, the regulation member 42 is provided to the base end-side of the first guide 51 and the regulation member 43 is provided to the tip end-side of the first guide 51. A gap through which the wire W can pass is formed between the guide surface 51*g* of the first guide 51 and the outer peripheral surface of the regulation member 42. A part of the outer peripheral surface of the regulation member 43 protrudes toward the guide surface 51*g* of the first guide 51.

The second guide 52 is attached to an end portion on the front side of the second body part 302. The second guide 52 is provided facing the first guide 51 in a second direction orthogonal to the first direction and denoted with an arrow A2. The first guide 51 and the second guide 52 are spaced by a predetermined interval in the second direction, and an insertion/pulling-out opening 53 in and from which the reinforcing bars S are inserted/pulled out is formed between the first guide 51 and the second guide 52, as shown in FIGS. 8A and 8B.

The guide part 5 has an induction part 59 configured to guide reinforcing bars S to the insertion/pulling-out opening 53. The induction part 59 is an example of the first induction part, is provided on the tip end-side of the first guide 51 integrally with the first guide 51, and is provided with a surface along which an interval between the first guide 51 and the second guide 52 decreases from a tip end-side toward a base end-side of the induction part 59. Specifically, as shown in FIG. 7, the induction part 59 is provided on a further tip end-side than an end portion P2 of the groove portion 51*h* on the tip end-side of the first guide 51. More specifically, the induction part 59 is constituted by an inclined surface inclined relative to the first direction denoted with the arrow A1 in a direction in which the interval between the first guide 51 and the second guide 52 decreases, from a tip end P1 of the first guide 51 toward a vicinity of the end portion P2 of the groove portion 51*h* of the first guide 51.

An inclination angle $\alpha$ of the induction part 59 is preferably equal to or larger than 6° and equal to or smaller than 45°, based on an axis line Ax (which will be described later). In the first guide 51, a length of the induction part 59 in the first direction denoted with the arrow A1, specifically, a length from the tip end P1 of the first guide 51 to the end portion P2 of the groove portion 51*h* on the tip end-side of the first guide 51 is preferably equal to or larger than 10 mm and equal to or smaller than 30 mm. In addition, a length in the same direction of the first guide 51 including the induction part 59, specifically, a length from a tip end P3 of the cover part 11, which will be described later, to the tip end P1 of the first guide 51 is preferably equal to or smaller than 110 mm.

When the inclination angle $\alpha$ of the induction part 59 is equal to or greater than 6°, even though the length of the induction part 59 from the tip end P1 of the first guide 51 to the end portion P2 of the groove portion 51*h* is set to 10 mm, the insertion/pulling-out opening 53 that is an interval between the first guide 51 and the second guide 52 can be increased to 1 mm or greater. However, when the inclination angle $\alpha$ of the induction part 59 exceeds 45°, while inserting the reinforcing bars S into the insertion/pulling-out opening 53 between the first guide 51 and the second guide 52, a force by which the reinforcing bars S push the reinforcing bar binding machine 1A toward an opposite side to a moving direction of the reinforcing bar binding machine 1A is generated, so that it is difficult to insert the reinforcing bars S into the insertion/pulling-out opening 53 while following the induction part 59. When the length of the induction part 59 is smaller than 10 mm, a length for moving the reinforcing bars S along the induction part 59 is insufficient. Also, when the length of the induction part 59 exceeds 30 mm, a resistance is caused while moving the reinforcing bars S along the induction part 59, so that it is difficult to insert the reinforcing bars S into the insertion/pulling-out opening 53 while following the induction part 59. Further, there are cases where a distance between a reinforcing bar arrangement surface on which the reinforcing bars S are arranged and a foundation structure located on a further lower side (floor side) than the reinforcing bar arrangement surface and a distance between the reinforcing bar arrangement surface on a front side and the reinforcing bar arrangement surface on a back side are 110 mm. In this case, when the length of the first guide 51 exceeds 110 mm, the tip end of the first guide 51 comes into contact with the foundation structure and the like, so that the reinforcing bars S cannot be inserted to a predetermined position in the insertion/pulling-out opening 53.

The first guide 51 has a visible part 510 for enabling a position of the guide part 5 to be visually recognized from the handle part 304*h*-side. The visible part 510 is an example of the first visible part, and protrudes further outward than an outer shape of the second body part 302. In the present embodiment, the visible part 510 is provided on the base end-side of the first guide 51, and protrudes in the second direction further outward than an outer shape of the second body part 302 toward an opposite direction to a side on which the second guide 52 is provided.

As shown in FIG. 9, the second guide 52 has a pair of side guides 52*a* facing each other in a third direction denoted with an arrow A3 orthogonal to the first direction and the second direction. As for the second guide 52, when a side attached to the second body part 302 is referred to as a base end-side and a side extending in the first direction from the second body part 302 is referred to as a tip end-side, a gap between the pair of side guides 52*a* gradually decreases from the tip end-side toward the base end-side. In the pair of side guides 52*a,* the base end-sides face each other with a gap through which the wire W can pass.

The second guide 52 is attached to the second body part 302 with being supported on the base end-side by a shaft 52*b*. An axis line of the shaft 52*b* faces toward the third direction. The second guide 52 can rotate about the shaft 52*b* as a support point with respect to the second body part 302. The second guide 52 can move in directions in which an end portion 52*c* on the tip end-side comes close to and gets away from an end portion 51*c* of the first guide 51 facing the second guide 52 in the second direction denoted with the arrow A2. The end portion P2 of the groove portion 51*h* is exposed to the end portion 51*c* of the first guide 51B.

The second guide 52 is configured to rotate about the shaft 52*b* as a support point, thereby moving between a first position (refer to the solid line in FIG. 8A) at which a distance between the end portion 52*c* of the second guide 52 and the end portion 51*c* of the first guide 51 is a first distance L1 and a second position (refer to the dashed-two dotted line in FIG. 8A and the solid line in FIG. 8B) at which the distance between the end portion 52*c* of the second guide 52 and the end portion 51*c* of the first guide 51 is a second distance L2 shorter than the first distance L1.

In a state where the second guide 52 is located at the second position, the end portion 52*c* of the second guide 52 and the end portion 51*c* of the first guide 51 are opened therebetween. In a state where the second guide 52 is located at the first position, the interval between the end portion 52*c* of the second guide 52 and the end portion 51*c* of the first guide 51 is larger, so that the reinforcing bars S can be more easily inserted into the insertion/pulling-out opening 53 between the first guide 51 and the second guide 52.

In the state where the second guide 52 is located at the second position, the side guides 52*a* are positioned on the feeding path Wf of the wire W shown with the broken line in FIGS. 8A and 8B. In the state where the second guide 52 is located at the first position, as long as the interval between the end portion 52*c* of the second guide 52 and the end portion 51*c* of the first guide 51 is greater than the case where the second guide 52 is located at the second position, the side guides 52*a* may be positioned on the feeding path Wf of the wire W or the side guides 52*a* may be positioned on an outermore side than the feeding path Wf of the wire W, as shown with the solid line in FIG. 8A.

The second guide 52 is urged in a moving direction to the first position by an urging member 54 such as a tortional coil spring and is held at the first position.

The reinforcing bar binding machine 1A includes a contact member 9A configured to detect the reinforcing bars S as the reinforcing bars S inserted in the insertion/pulling-out opening 53 between the first guide 51 and the second guide 52 are contacted thereto, and to actuate the second guide 52. The reinforcing bar binding machine 1A also includes a cover part 11 configured to cover the end portion on the front side of the second body part 302.

The cover part 11 is attached from the end portion on the front side of the second body part 302 over both left and right sides of the second body part 302 in the third direction. The cover part 11 is constituted by a metal plate or the like, and has a shape to cover a portion or all of the end portion on the front side of the second body part 302 and portions of both left and right sides on the front side of the second body part 302, between the base end-side of the first guide 51 and the base end-side of the second guide 52. While the second body part 302 is made of resin, the cover part 11 is made of metal, so that even when the contact member 9A and the reinforcing bars S are contacted to the cover part 11, the wear of the cover part 11 can be reduced.

The contact member 9A is rotatably supported by a shall 90A and is attached to the second body part 302 via the cover part 11. The contact member 9A has a bent shape, and has contact parts 91A provided on one side with respect to the shaft 90A and to be contacted to the reinforcing bars S and a connecting part 92A provided on the other side with respect to the shaft 90A and connected to the second guide 52. Specifically, the contact parts 91A are provided on one side with respect to the shaft 90A in the second direction, and the connecting part 92A is provided on the other side.

The contact member 9A has the shaft 90A provided adjacent to a center between the first guide 51 and the second guide 52. The contact member 9A also has a pair of contact parts 91A in the third direction denoted with the arrow A3 with an interval, through which the wire W binding the reinforcing bars S can pass, from the vicinity of a part supported by the shaft 90A toward the first guide 51-side. The contact parts 91A extend to both left and right sides of the first guide 51.

The contact member 9A also has the connecting part 92A provided from the part supported by the shaft 90A toward the second guide 52-side, and a displacing part 93A in contact with a part on an opposite side to a side of the second guide 52 facing the first guide 51 is provided on a tip end-side of the connecting part 92A.

The contact member 9A is configured to rotate about the shaft 90A as a support point with respect to the second body part 302, so that the contact parts 91A move between a standby position (FIG. 10A) at which the contact parts 91A protrude from the cover part 11 into the insertion/pulling-out opening 53 and an actuation position (FIG. 10B) at which the contact parts 91A come close to the cover part 11.

In a state where the contact member 9A is moved to the actuation position shown in FIG. 10B, the contact member 9A has such a shape that the contact parts 91A extend from the shaft 90A toward the first guide 51 along the second direction denoted with the arrow A2. Therefore, the rotation of the contact member 9A about the shaft 90A as a support point causes the contact parts 91A to move in the first direction denoted with the arrow A1 along an arc whose center is the shaft 90A. During an operation of inserting the reinforcing bars S into the insertion/pulling-out opening 53 between the first guide 51 and the second guide 52, the reinforcing bar binding machine 1A is moved in the first direction denoted with the arrow A1. Due to the relative movement of the reinforcing bar binding machine 1A and the reinforcing bars S, the contact parts 91A are pushed by a force along the first direction denoted with the arrow A1, so that the contact member 9A is moved to the actuation position. Thereby, a moving direction of the contact parts 91A due to the rotation about the shaft 90A as a support point becomes a direction along the direction of the force by which the reinforcing bars S push the contact parts 91A by the relative movement of the reinforcing bar binding machine 1A and the reinforcing bars S. Also, in the state where the contact member is moved to the actuation position shown in FIG. 10B, the contact member 9A has such a shape that the connecting part 92A is tilted forward from the shaft 90A with respect to the contact parts 91A and extends toward the second guide 52. Therefore, the rotation of the contact member 9A about the shaft 90A as a support point causes the displacing part 93A to move in the second direction denoted with the arrow A2 along an arc whose center is the shaft 90A. Thereby, in a state where the contact member 9A is urged by the urging member 54 and the second guide 52 is thus located at the first position, the displacing part 93A is pushed away from the first guide 51 by the second guide 52. For this reason, the contact member 9A is moved to the standby position by the rotation about the shaft 90A as a support point, so that the contact parts 91A protrude from the cover part 11. Note that, in the present example, the contact member 9A is configured to move by the force of the urging member 54 for urging the second guide 52. However, another urging member for urging the contact member 9A may also be provided.

When the contact parts 91A are pressed against the reinforcing bars S, the contact parts 91A are moved in the first direction. Thereby, the contact member 9A rotates about the shaft 90A as a support point and moves to the actuation position. When the contact member 9A is moved to the actuation position, the displacing part 93A is moved toward the first guide 51 by the rotation of the connecting part 92A about the shaft 90A as a support point. Thereby, the displacing part 93A pushes the second guide 52, so that the second guide 52 is moved to the second position. In this way, the contact of the reinforcing bars S to the contact parts 91A and the movement of the displacing part 93A cause the second guide 52 to move from the first position to the second position.

Figure 11:
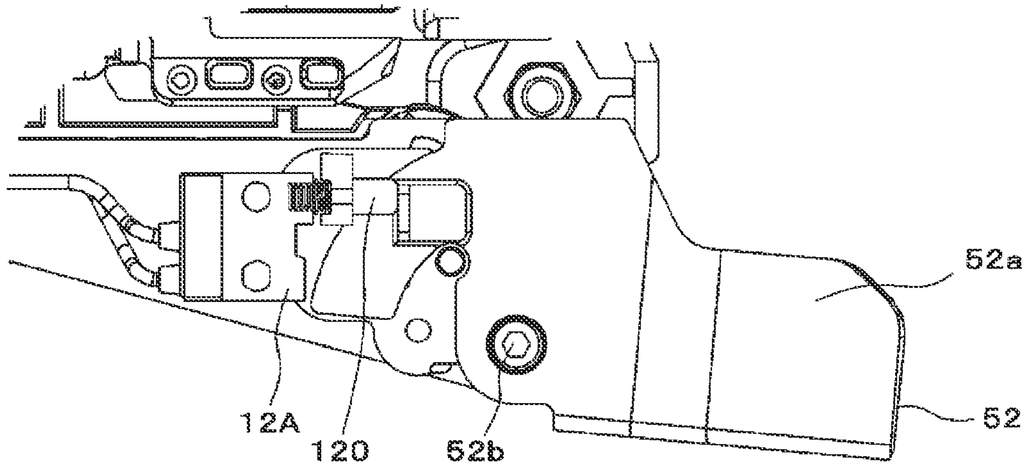
FIG. 11 is a side view depicting an example of an output unit configured to detect a second guide.

FIG. 11 is a side depicting an example of an output unit configured to detect the second guide. In the below, a second output unit 12A is described in detail with reference to each drawing. The reinforcing bar binding machine 1A includes a second output unit 12A configured to detect that the second guide 52 is moved to the second position, thereby performing a predetermined output. The second output unit 12A has a configuration where an output thereof changes by displacement of a movable element 120, for example. In the present example, when the contact member 9A is moved to the standby position and the second guide 52 is thus moved to the first position, the second guide 52 is moved away from the movable element 120. In this way, in a state where the second guide 52 is moved to the first position, an output of the second output unit 12A is set to an off state. In contrast, when the contact member 9A is moved to the actuation position and the second guide 52 is thus moved to the second position, the second guide 52 is moved in a direction of pushing the movable element 120. In this way, in a state where the second guide 52 is moved to the second position, an output of the second output unit 12A is set to an on state. Note that, the output unit configured to detect the second guide may be constituted by a non-contact sensor. Further, instead of the output unit configured to detect the second guide, an output unit configured to detect that the contact member is moved to the actuation position may be provided.

Subsequently, the twisting unit 7 and the drive unit 8 are described with reference to each drawing. The twisting unit 7 includes an engaging part 70 to which the wire W is engaged, and an actuation part 71 configured to actuate the engaging part 70. The engaging part 70 is configured to rotate by an operation of the actuation part 71, thereby twisting the wire W wound on the reinforcing bars S.

The drive unit 8 includes a twisting motor 80 configured to drive the twisting unit 7 and the like, a decelerator 81 configured to perform deceleration and torque amplification, a rotary shaft 72 configured to drive and rotate via the decelerator 81 by the twisting motor 80, and a movable member 83 configured to transmit a drive force to the cutting unit 6 and the regulation member 42. The twisting unit 7 and the drive unit 8 are arranged so that centers of rotation of the rotary shaft 82, the actuation part 71 and the engaging part 70 are on the same axis. The centers of rotation of the rotary shaft 82, the actuation part 71 and the engaging part 70 are referred to as an axis line Ax.

The engaging part 70 is formed with a first passage through which the wire W fed to the cutting unit 6 by the feeding unit 3 passes, and a second passage through which the wire W curled by the regulation part 4 and guided to the twisting unit 7 by the guide part 5 passes.

The drive unit 8 is configured to move the actuation part 71 along an axis direction of the rotary shaft 82 by a rotating operation of the rotary shaft 82. The actuation part 71 is moved along the axis direction of the rotary shall 82, so that the engaging part 70 holds a tip end-side of the wire W guided to the twisting unit 7 by the guide part 5.

In the drive unit 8, the movable member 83 is configured to move along the axis direction of the rotary shaft 82 in conjunction with the moving operation of the actuation part 71 along the axis direction of the rotary shaft 82, so that the motion of the movable member 83 is transmitted to the regulation member 42 by the transmission mechanism 44 and the regulation member 42 is thus moved to a position at which it does not contact the wire. In addition, the actuation part 71 is configured to move along the axis direction of the rotary shaft 82, so that the motion of the movable member 83 is transmitted to the movable blade part 61 by the transmission mechanism 62 and the movable blade part 61 is thus actuated to cut the wire W.

The drive unit 8 is configured to rotate the actuation part 71 moved along the axis direction of the rotary shaft 82 by the rotating operation of the rotary shaft 82. The actuation part 71 is configured to rotate about the axis of the rotary shaft 82, thereby twisting the wire W by the engaging part 70.

Figure 12:
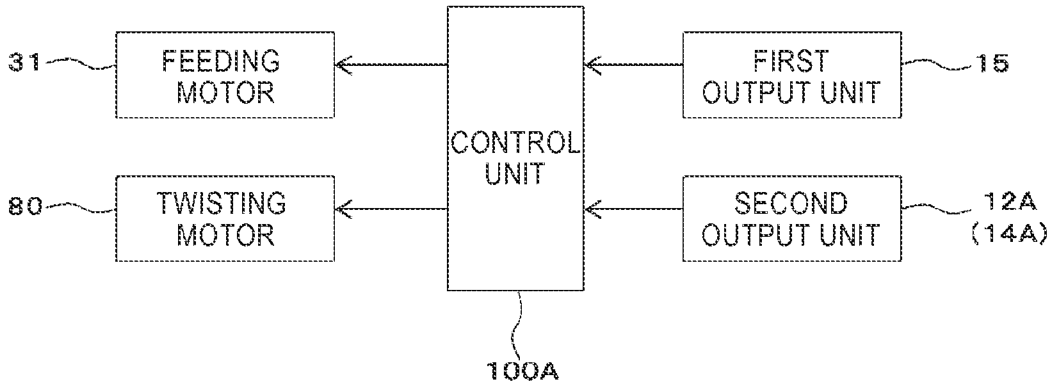
FIG. 12 is a functional block diagram of the reinforcing bar binding machine of the first embodiment.

FIG. 12 is a functional block diagram of the reinforcing bar binding machine of the first embodiment. In the reinforcing bar binding machine 1A, a control unit 100A is configured to detect outputs of a first output unit 15 configured to be actuated as the operation part 304*t* is operated and a second output unit 12A configured to be actuated as the reinforcing bars S are contacted to the contact parts 91A of the contact member 9A and the reinforcing bars S are pressed. The control unit 100A is configured to control the feeding motor 31 configured to drive the feeding gears 30 and the twisting motor 80 configured to drive the twisting unit 7 and the like, in response to the outputs of the first output unit 15 and the second output unit 12A, thereby executing a series of operations of binding the reinforcing bars S with the wire W.

Subsequently, operations of binding the reinforcing bars S with the wire W by the reinforcing bar binding machine 1A are described. The operator grips the handle part 304*h* of the reinforcing bar binding machine 1A with both hands. That is, the operator grasps the grip part 304R of the handle part 304*h* with a right hand and grasps the grip part 304L of the handle part 304*h* with a left hand.

When the operation part 304*t* is grasped together with the grip part 304R by the operator, the operation part 304*t* rotates with respect to the grip part 304R and is thus actuated. When the operation part 304*t* is actuated, the output of the first output unit 15 becomes on, and the control unit 100A detects that the output of the first output unit 15 becomes on.

The operator grips the handle part 304*h* of the reinforcing bar binding machine 1A with both hands, aligns a position of the guide part 5 with an intersection point of the two reinforcing bars S, and inserts the reinforcing bars S into the insertion/pulling-out opening 53.

In order to bind the reinforcing bars S at the feet of the operator, the reinforcing bar binding machine 1A is used with the guide part S facing downward in a state where the operator stands. The reinforcing bars S that a binding object are distant from the handle part 304*h,* and a field of view is blocked by the first body part 301, the connecting part 303 and the second body part 302, so that it is difficult to see the guide part 5 and the intersection point of the two reinforcing bars S. For this reason, it is difficult to align the position of the guide part 5 with the intersection point of the two reinforcing bars S. Further, during the operations of binding the reinforcing bars S, the intersection point of the reinforcing bars S is preferably substantially matched with a virtual plane including the feeding path Wf of the wire W shown in FIG. 7 and the like.

Therefore, the reinforcing bar binding machine 1A includes the visible part 510 for enabling the position of the guide part S to be visually recognized from the handle part 304*h*-side. The visible part 510 is provided on the base end-side of the first guide 51, and protrudes in the second direction from the second body part 302 toward an opposite direction to the side on which the second guide 52 is provided. In this way, the visible part 510 is provided to the first guide 51 with protruding from the second body part 302, so that the operator who stands with gripping the handle part 304*h* can easily visually recognize the visible part 510. In addition, the visible part 510 is provided at a position that substantially matches the virtual plane including the feeding path Wf of the wire W passing through the groove portion 51*h* of the first guide 51 shown in FIG. 1. Therefore, a position of the virtual plane including the feeding path Wf of the wire W can be visually recognized as the position of the visible part 510. Thereby, while visually recognizing the visible part 510, the position of the first guide 51 can be easily aligned with the intersection point of the reinforcing bars S. The position of the first guide 51 is aligned with the intersection point of the reinforcing bars S, so that the intersection point of the reinforcing bars S can be substantially matched with the virtual plane including the feeding path Wf of the wire W.

The reinforcing bar binding machine 1A also has the induction part 59 provided on the tip end-side of the first guide 51 and having a shape capable of guiding the reinforcing bars S to the insertion/pulling-out opening 53. The operator can bring the reinforcing bars S into contact with the induction part 59 and move the induction part 59 on the reinforcing bars S in a sliding manner. Thereby, when the induction part 59 of the first guide 51 is butted against the reinforcing bars S, the first guide 51 can be guided in the direction in which the reinforcing bars S are inserted into the insertion/pulling-out opening 53. When the inclination angle $\alpha$ of the induction part 59 is equal to or larger than 5° and equal to or smaller than 45°, based on the axis line Ax, the induction part 59 of the first guide 51 is butted against the reinforcing bars S, so that the first guide 51 can be securely guided in the direction in which the reinforcing bars S are inserted into the insertion/pulling-out opening 53.

In addition, according to the reinforcing bar binding machine 1A, in a state where the reinforcing bars S are not inserted in the insertion/pulling-out opening 53, as shown in FIG. 10A, the second guide 52 is moved to the first position, so that the interval between the end portion 52*c* of the second guide 52 and the end portion 51*c* of the first guide 51 increases. Thereby, the reinforcing bars S can be more easily inserted into the insertion/pulling-out opening 53.

Note that, in a case where an obstacle such as a separate reinforcing bar and a wall surface exists on an inner side of the reinforcing bars S that is a binding object, when the tip end P1 of the first guide 51 collides with the obstacle, the reinforcing bars S that is a binding object cannot be contacted to the contact parts 91A of the contact member 9A. In contrast, when a length from the tip end P1 of the first guide 51 to the end portion P2 of the groove portion 51*h* on the tip end-side of the first guide 51 is equal to or larger than 10 mm and equal to or less than 30 mm, the tip end P1 of the first guide 51 is suppressed from colliding with the obstacle, so that the reinforcing bars S can be brought into contact with the contact parts 91A of the contact member 9A.

The operator presses the reinforcing bars S against the contact parts 91A of the contact member 9A by the operation of moving the reinforcing bar binding machine 1A in the direction in which the reinforcing bars S are inserted into the insertion/pulling-out opening 53.

Due to the operation of moving the reinforcing bar binding machine 1A in the direction of inserting the reinforcing bars S into the insertion/pulling-out opening 53, the contact member 9A is applied with a force along the moving direction of the reinforcing bar binding machine 1A, so that the contact pails 91A are pushed. Thereby, the contact parts 91A are moved in the first direction denoted with the arrow A1, so that the contact member 9A rotates about the shaft 90A as a support point, thereby moving to the actuation position, as shown in FIG. 10B.

When the two intersecting reinforcing bars S are inserted into the insertion/pulling-out opening 53, one reinforcing bar S is located at one side part of the first guide 51 and the other reinforcing bar S is located at the other side part of the first guide 51. In contrast, the pair of contact parts 91A of the contact member 9A extends from between the first guide 51 and the second guide 52 toward both left and right sides of the first guide 51. Thereby, the reinforcing bars S inserted in the insertion/pulling-out opening 53 are securely contacted to the contact parts 91A, so that the contact member 9A can be moved to the actuation position. In addition, the contact parts 91A of the contact member 9A are moved in the first direction denoted with the arrow A1 by the rotating operation about the shaft 90A as a support point. Thereby, the contact parts 91A can be pushed by the operation of moving the reinforcing bar binding machine 1A in the direction of inserting the reinforcing bars S into the insertion/pulling-out opening 53, and it is not necessary to move the reinforcing bar binding machine 1A in another direction so as to actuate the contact member 9A.

When the contact member 9A is moved to the actuation position, the rotation of the connecting part 92A about the shaft 90A as a support point causes the displacing part 93A to push the second guide 52 toward the first guide 51, so that the second guide 52 is moved to the second position.

When the second guide 52 is moved to the second position, the output of the second output unit 12A becomes on, and the control unit 100A detects that the output of the second output unit 12A becomes on. In a state where the contact member 9A is moved to the actuation position and thus the output of the second output unit 12A becomes on, the reinforcing bars S are in a state where the reinforcing bars are within the feeding path Wf of the wire W shown with the broken line in FIG. 7 and are inserted to a bindable position. Thereby, the second output unit 12A can detect that the reinforcing bars S are inserted in the feeding path Wf of the wire W.

When it is detected that the output of the second output unit 12A becomes on, in a state where it is detected that the output of the first output unit 15 becomes on, the control unit 100A controls the feeding motor 31 and the twisting motor 80 to execute a series of operations of binding the reinforcing bars S with the wire W.

The binding operation is described in detail. The feeding motor 31 is rotated in the forward direction and the feeding gears 30 are thus rotated in the forward direction, so that the wire W is fed in the forward direction denoted with the arrow F. The wire W fed in the forward direction by the feeding unit 3 passes through the fixed blade part 60, which is the first regulation member constituting the regulation part 4, and the regulation member 42 that is the second regulation member. The wire W having passed through the regulation member 42 is contacted to the guide surface 51*g* of the first guide 51 and is thus guided to the regulation member 43 that is the third regulation member.

Thereby, the wire W fed in the forward direction by the feeding unit 3 is contacted to the fixed blade part 60, the regulation member 42, the regulation member 43, and the guide surface 51*g* of the first guide 51 and is thus bent into an arc shape. Then, the wire W fed in the forward direction by the feeding unit 3 is contacted to the fixed blade part 60 and the regulation member 43 from an outer periphery direction of the arc shape and is contacted to the regulation member 42 between the fixed blade part 60 and the regulation member 43 from an inner periphery direction of the arc shape, so that a substantially circular curl is formed.

The end portion 51*c* of the first guide 51 and the end portion 52*c* of the second guide 52 are spaced by a predetermined interval in a state where the second guide 52 is moved to the second position. However, in the state where the second guide 52 is moved to the second position, the pair of side guides 52*a* is positioned on the feeding path Wf of the wire W, and the wire W fed in the forward direction by the feeding unit 3 is curled by the regulation part 4, as described above, so that the wire is guided between the pair of side guides 52*a* of the second guide 52.

The wire W guided between the pair of side guides 52*a* of the second guide 52 is fed in the forward direction by the feeding unit 3, so that the wire is guided to the engaging part 70 of the twisting unit 7 by the pair of side guides 52*a* of the second guide 52. Then, when it is determined that a tip end portion of the wire W is fed to a predetermined position, the control unit 100A stops the drive of the feeding motor 31. Thereby, the wire W is spirally wound around the reinforcing bars S. Note that, in a state where the second guide 52 is not moved to the second position and the output of the second output unit 12A is off, the control unit 100A does not perform the feeding of the wire W. Thereby, the wire W is not engaged to the engaging part 70 of the twisting unit 7, and occurrence of poor feeding is suppressed.

After stopping the feeding of the wire W in the forward direction, the control unit 100A rotates the twisting motor 80 in the forward direction. The twisting motor 80 is rotated in the forward direction, so that the engaging part 70 is actuated by the actuation part 71 and the tip end-side of the wire W is held by the engaging part 70.

When it is determined that the twisting motor 80 is rotated until the wire W is held by the engaging part 70, the control unit 100A stops the rotation of the twisting motor 80, and rotates the feeding motor 31 in the reverse direction. When the twisting motor 80 is rotated until the wire W is held by the engaging part 70, the motion of the movable member 83 is transmitted to the regulation member 42 by the transmission mechanism 44, so that the regulation member 42 is moved to a position at which it is not contacted to the wire.

When the feeding motor 31 is rotated in the reverse direction, the feeding gears 30 are rotated in the reverse direction, so that the wire W is fed in the reverse direction denoted with the arrow R. By the operation of feeding the wire W in the reverse direction, the wire W is wound closely contacted to the reinforcing bars S.

When it is determined that the feeding motor 31 is rotated in the reverse direction until the wire W is wound on the reinforcing bars S, the control unit 100A stops the rotation of the feeding motor 31, and then rotates the twisting motor 80 in the forward direction. The twisting motor 80 is rotated in the forward direction, so that the movable blade part 61 is actuated via the transmission mechanism 62 by the movable member 83 and the wire W is thus cut.

After the wire W is cut, the twisting motor 80 is continuously rotated in the forward direction, thereby rotating the engaging part 70 to twist the wire W.

When it is determined that the twisting motor 80 is rotated in the forward direction until the wire W is twisted, the control unit 100A rotates the twisting motor 80 in the reverse direction. The twisting motor 80 is rotated in the reverse direction, so that the engaging part 70 is returned to the initial position and the held state of the wire W is thus released. Thereby, the wire W binding the reinforcing bars S can be pulled out from the engaging part 70.

When it is determined that the twisting motor 80 is rotated in the reverse direction until the engaging part 70 and the like are returned to the initial position, the control unit 100A stops the rotation of the twisting motor 80.

The operator moves the reinforcing bar binding machine 1A in a direction of pulling out the reinforcing bars S bound with the wire W from the insertion/pulling-out opening 53. When the force of pushing the contact parts 91A of the contact member 9A is not applied by the operation of moving the reinforcing bar binding machine 1A in the direction of pulling out the reinforcing bars S from the insertion/pulling-out opening 53, the second guide 52 is moved from the second position to the first position by the force of the urging member 54.

When the second guide 52 is moved to the first position, the contact member 9A is pushed in a direction in which the displacing part 93A gets away from the first guide 51, and is moved to the standby position by the rotation about the shaft 90A as a support point, so that the contact parts 91A protrude from the cover part 11.

The operator's operation of moving the reinforcing bar binding machine 1A in the direction of pulling out the reinforcing bars S bound with the wire W from the insertion/pulling-out opening 53 causes the second guide 52 to move to the first position, so that the interval between the end portion 52*c* of the second guide 52 and the end portion 51*c* of the first guide 51 increases. Thereby, the reinforcing bars S can be more easily pulled out from the insertion/pulling-out opening 53.

Figure 13:
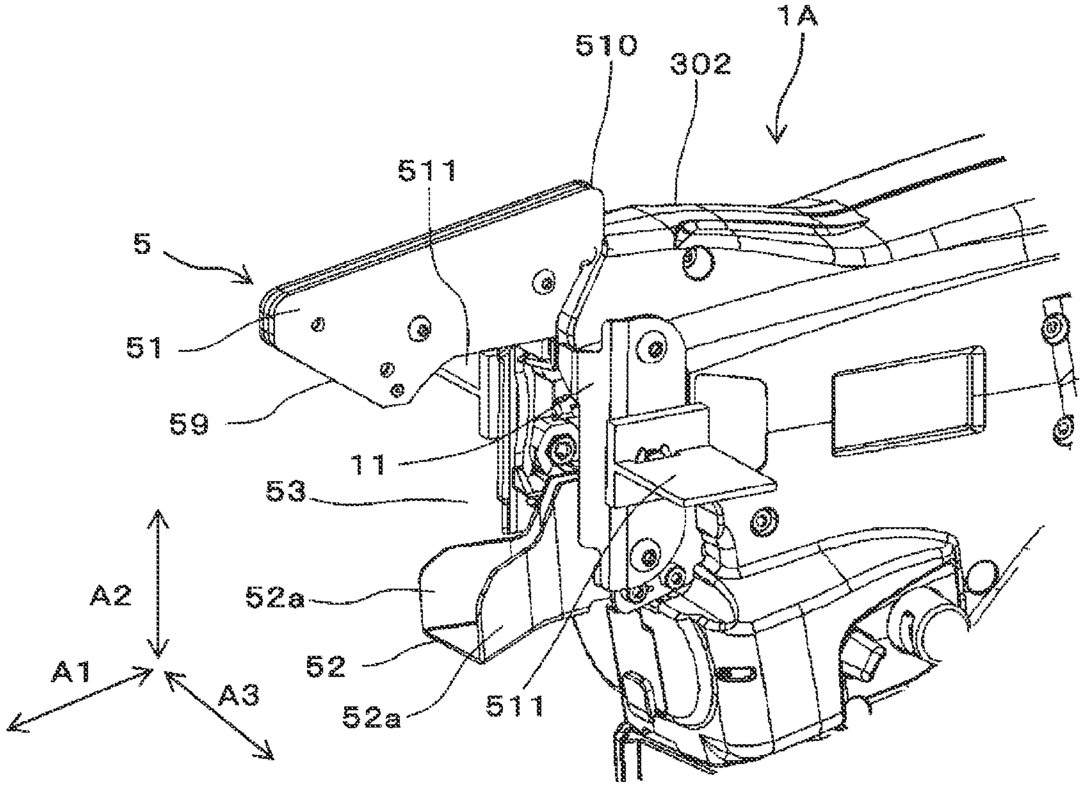
FIG. 13 is a perspective view depicting a modified embodiment of a visible part.
Figure 14A:
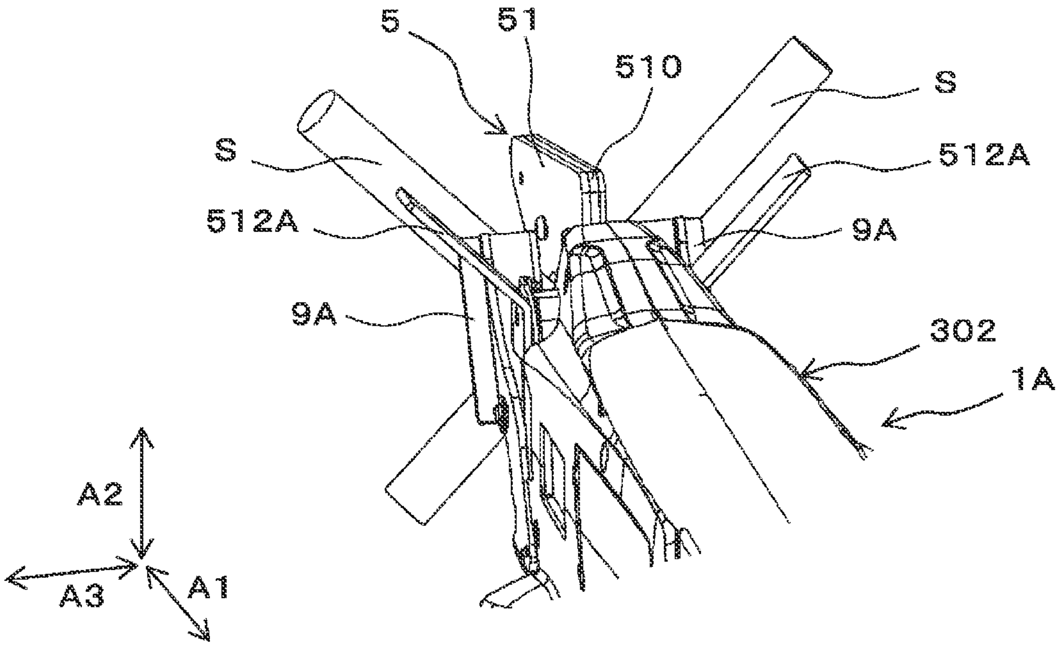
FIG. 14A is a perspective view depicting a modified embodiment of the visible part.
Figure 14B:
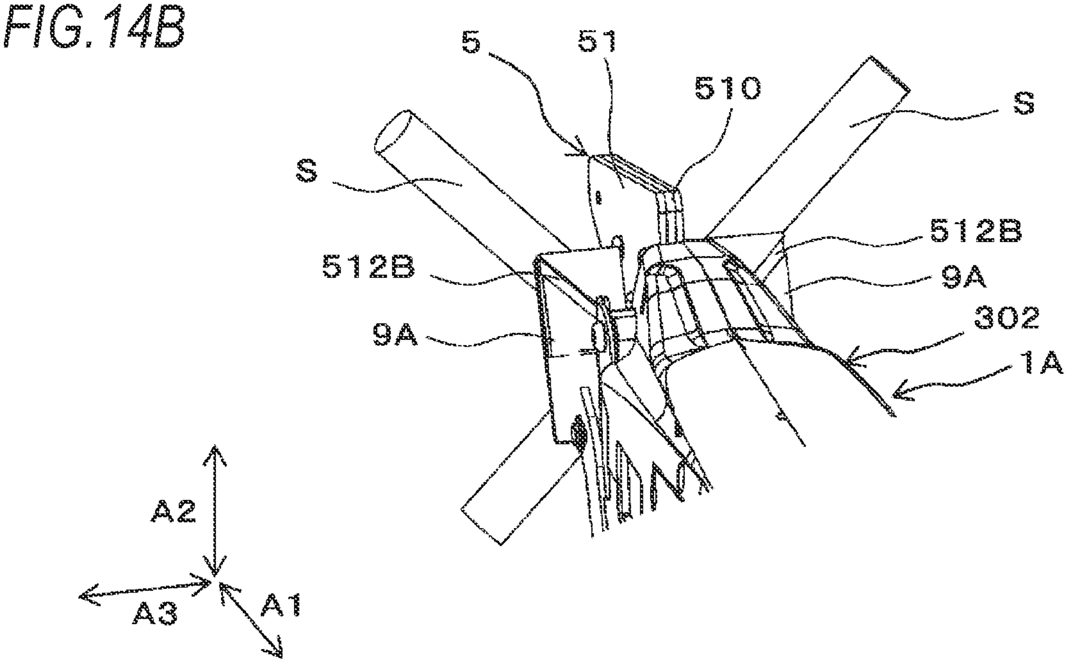
FIG. 14B is a perspective view depicting a modified embodiment of the visible part.

FIGS. 13, 14A and 14B are perspective views depicting modified embodiments of the visible part. In FIG. 13, visible parts 511 for enabling a position of the insertion/pulling-out opening 53 between the first guide 51 and the second guide 52 to be visually recognized from the handle part 304*h*-side are provided.

The visible parts 511 are an example of the second visible part, are provided to the cover part 11, and protrude to both left and right sides in the third direction denoted with the arrow A3. The visible parts 511 are located on the axis line Ax shown in FIG. 7 in the second direction denoted with the arrow A2. During the operations of binding the reinforcing bars S, the intersection point of the reinforcing bars S is preferably substantially matched with the virtual plane including the feeding path Wf of the wire W shown in FIG. 7 and the axis line Ax. Thereby, while checking the positions of the visible part 510 and the visible parts 511 with griping the handle part 304*h* of the reinforcing bar binding machine 1A with both hands, the operator can align the positions of the visible part 510 and the visible parts 511 with the intersection point of the reinforcing bars 5, insert the reinforcing bars S into the insertion/pulling-out opening 53 and align a direction of the first guide 51 with respect to the reinforcing bars S.

In FIGS. 14A and 14B, visible parts 512 (A, B), which are the second visible part capable of enabling a position and a direction of the reinforcing bar binding machine 1A relative to the intersecting reinforcing bars S to be visually recognized from the handle part 304*h*-side and a direction of the first guide 51 to be aligned with respect to the reinforcing bars S, are provided. In FIG. 14A, the visible parts 512A are provided to the cover part 11 and protrude in both left and right directions with predetermined angles with respect to the second direction denoted with the arrow A2 and the third direction denoted with the arrow A3. An angle of the pair of visible pails 512A is about 90°.

In FIG. 14B, the visible parts 512B are each provided to each of a pair of contact members 9A, and are constituted by lines of different colors extending in both left and right directions with predetermined angles with respect to the second direction denoted with the arrow A2 and the third direction denoted with the arrow A3, uneven shapes indicative of the lines, and the like. An angle of the pair of visible parts 512B is about 90°.

Thereby, while checking the positions of the visible parts 512A; 512B with griping the handle part 304*h* of the reinforcing bar binding machine 1A with both hands, the operator can align the directions of visible parts 512A; 512B with each of the directions of the intersecting reinforcing bars S, and insert the reinforcing bars S into the insertion/pulling-out opening 53.

Figure 15A:
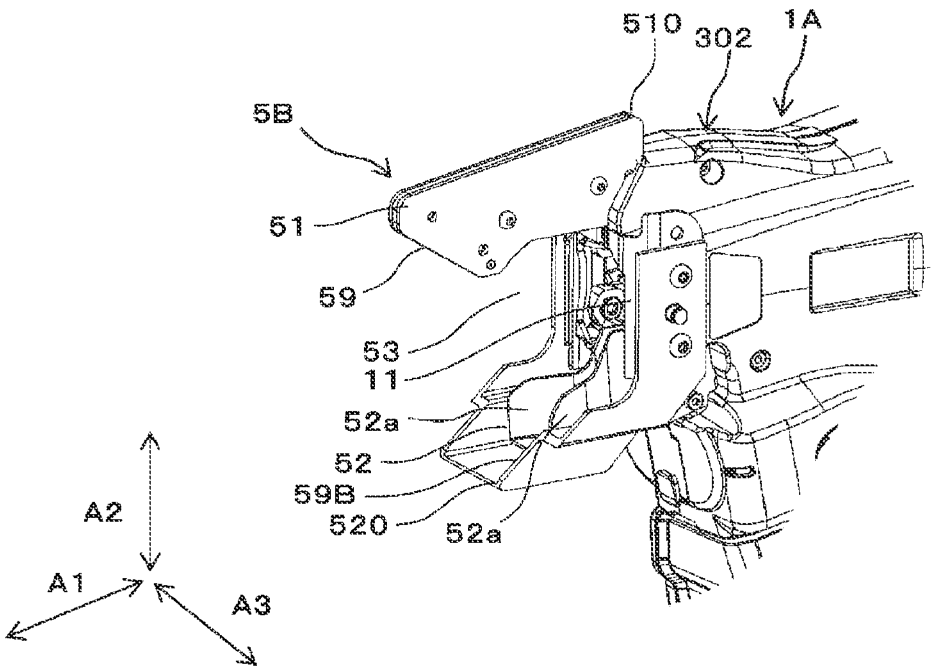
FIG. 15A is a perspective view depicting a modified embodiment of a guide part.
Figure 15B:
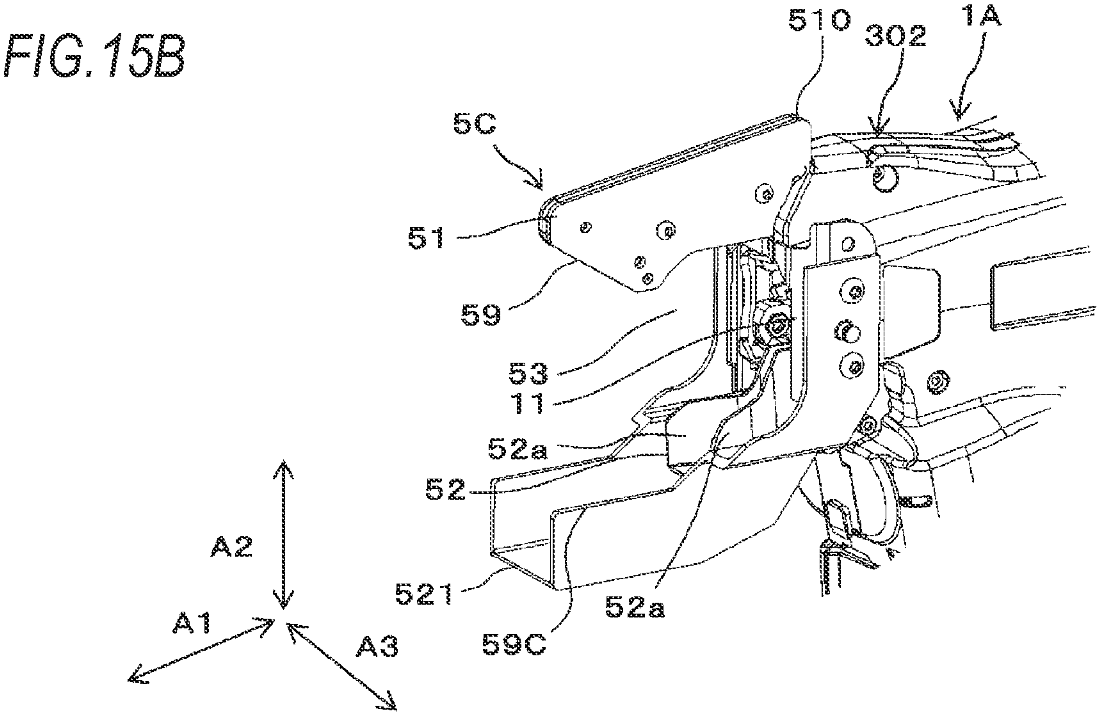
FIG. 15B is a perspective view depicting a modified embodiment of the guide part.

FIGS. 15A and 15B are perspective views depicting modified embodiments of the guide part. In FIG. 15A, a guide part 5B has an induction part 59B, which is the second induction part configured to guide the reinforcing bars S into the insertion/pulling-out opening 53 and is provided facing the insertion/pulling-out opening 53 on the side on which the second guide 52 is provided.

The guide part 5B has a third guide 520 provided on the tip end-side of the second guide 52. The third guide 520 is attached to the second body part 302 via the cover part 11. While the second guide 52 is configured to move toward and away from the first guide 51, the third guide 520 is not moved away from and toward the first guide 51.

The third guide 520 extends ahead of the second guide 52 in the first direction denoted with the arrow A1 and in an opposite direction to the first guide 51 in the second direction denoted with the arrow A2, in such an aspect of covering the second guide 52, and the induction part 59B is provided on a tip end-side of the third guide 520.

The induction part 59B is constituted by providing a surface along which an interval between the third guide 520 and the first guide 51 decreases from a tip end of the third guide 520 toward the tip end-side of the second guide 52. Specifically, the induction part 59B is constituted by an inclined surface inclined relative to the first direction denoted with the arrow A1 in a direction in which the interval between the third guide 520 and the first guide 51 decreases, from the tip end of the third guide 520 toward the tip end of the second guide 52.

In the configuration of FIG. 15A, the induction part 59B of the third guide 520 can be brought into contact with the reinforcing bars S and the induction part 59B can be moved in a sliding manner on the reinforcing bars S. For this reason, the induction part 59B can guide the third guide 520 in the direction in which the reinforcing bars S are inserted into the insertion/pulling-out opening 53.

In FIG. 15B, a guide part 5C has an induction part 59C, which is the second induction part configured to guide the reinforcing bars S into the insertion/pulling-out opening 53 and is provided facing the insertion/pulling-out opening 53 on the side on which the second guide 52 is provided.

The guide part 5C has a third guide 521 provided on the tip end-side of the second guide 52. The third guide 521 is attached to the second body part 302 via the cover part 11. While the second guide 52 is configured to move toward and away from the first guide 51, the third guide 521 is not moved away from and toward the first guide 51.

The third guide 521 extends ahead of the second guide 52 up to a part facing the induction part 59 of the first guide 51 in the first direction denoted with the arrow A1, in such an aspect of covering the second guide 52, and the induction part 59C is provided facing the induction part 59 of the first guide 51 on the tip end-side of the third guide 520.

In the configuration of FIG. 15B, the third guide 521 is longer than the first guide 51 in the first direction denoted with the arrow A1. Thereby, the induction part 59C of the third guide 521 is brought into contact with the reinforcing bars S and the induction part 59C is caused to move in a sliding manner on the reinforcing bars S, so that the reinforcing bars S are inserted between the induction part 59 of the first guide and the induction part 59C of the third guide 521. As a result, the reinforcing bars S can be guided into the insertion/pulling-out opening 53 with following the induction part 59C of the third guide 521.

Figure 16A:
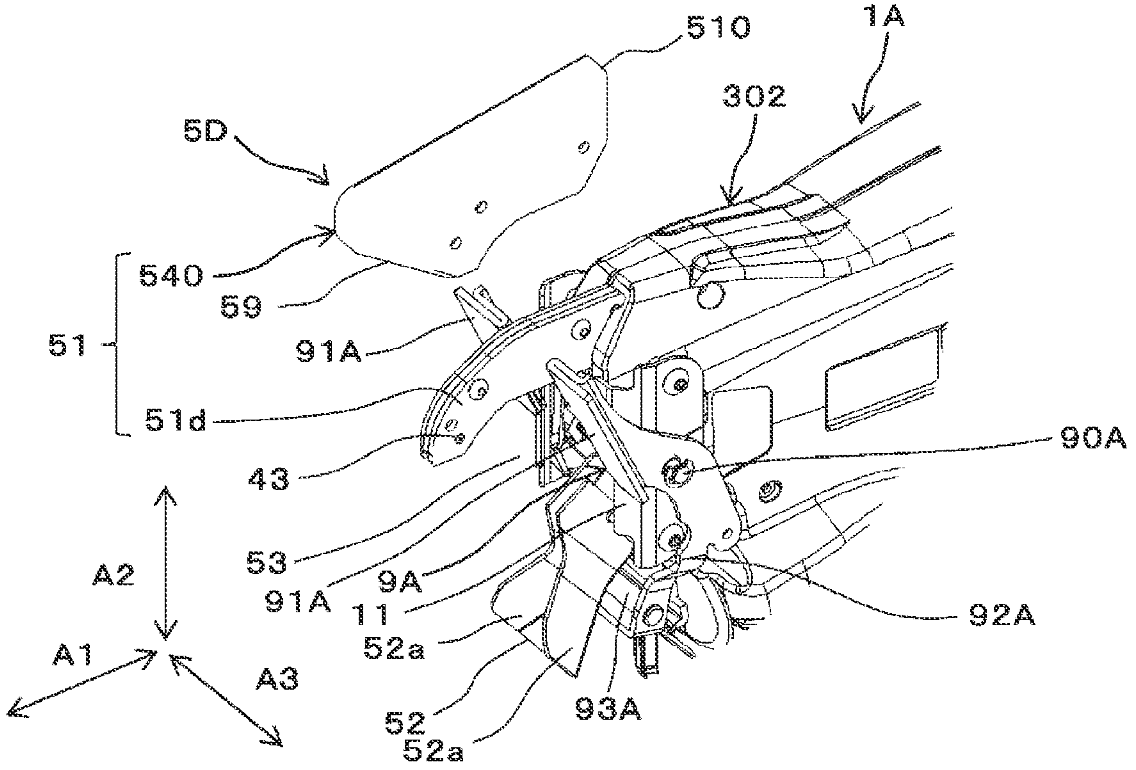
FIG. 16A is a perspective view depicting another modified embodiment of the guide part.
Figure 16B:
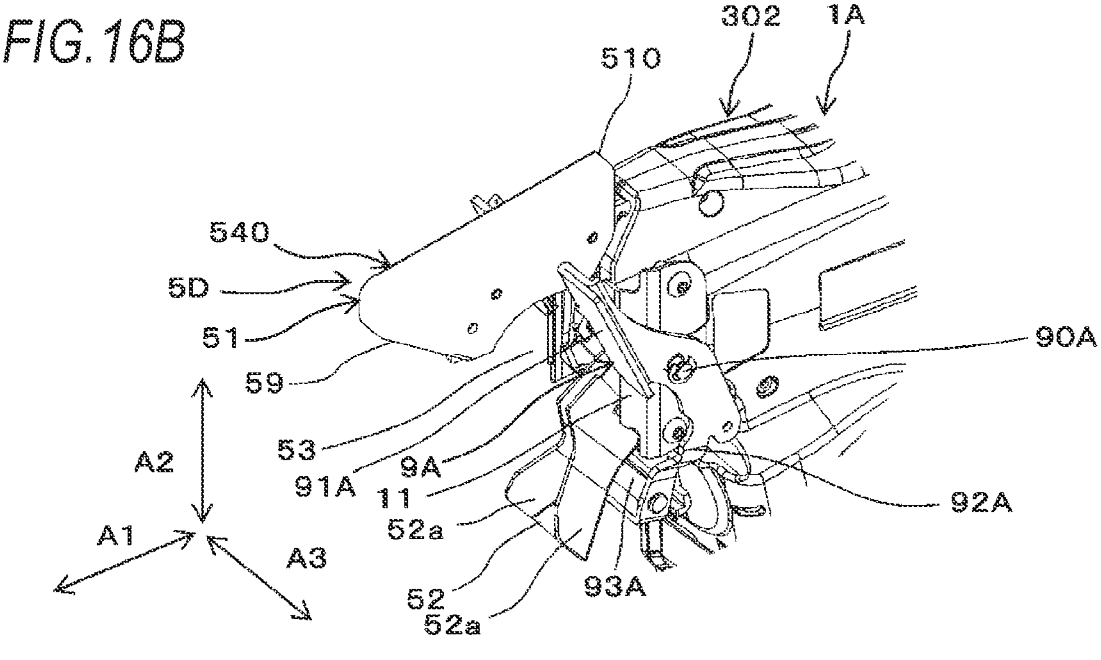
FIG. 16B is a perspective view depicting another modified embodiment of the guide part.

FIGS. 16A, 16B, 17A and 17B are perspective views depicting other modified embodiments of the guide part. In FIGS. 16A and 16B, a guide part 5D has a guide cover part 540 provided with the induction part 59 and the visible part 510. The first guide 51 has the groove portion 51*h* having the guide surface 51*g* and the regulation member 43, which are described with reference to FIG. 7, and a guide arm 51*d* configured to guide the wire W. The first guide 51 also has the guide cover part 540, and the guide cover part 540 is configured to be detachably mounted to the guide arm 51*d*. Since the configurations of the groove portion 51*h*, the regulation member 43 and the like provided to the guide arm 51*d* are required to curl the wire W and to have accuracy, the guide arm 51*d* is constituted as a part fixed to the second body part 302.

In contrast, the induction part 59 and the visible part 510 are not necessarily required to curl the wire W. For this reason, since the accuracy thereof is not required, as compared to the groove portion 51*h* having the guide surface 51*g* and the regulation member 43, the induction part 59 and the visible part 510 can be configured to be detachably mounted to the guide arm 51*d*, as independent parts.

The guide cover part 540 provided with the induction part 59 and the visible part 510 is configured to be detachably mounted to the guide arm 51*d*, so that the guide cover part 540 can be replaced. In addition, the guide cover part 540 can be used with being detached, as shown in FIG. 16A, or with being attached, as shown in FIG. 16B, as required. Further, a guide cover having another function may also be attached to the guide arm 51*d*.

Figure 17A:
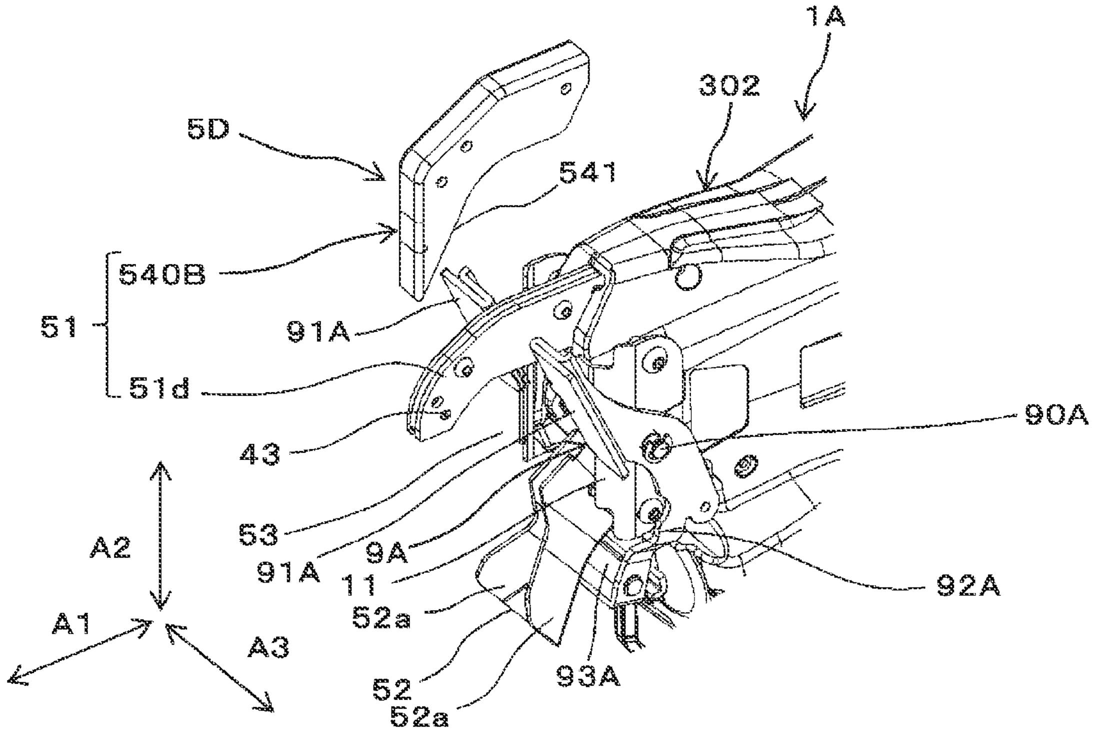
FIG. 17A is a perspective view depicting another modified embodiment of the guide part.
Figure 17B:
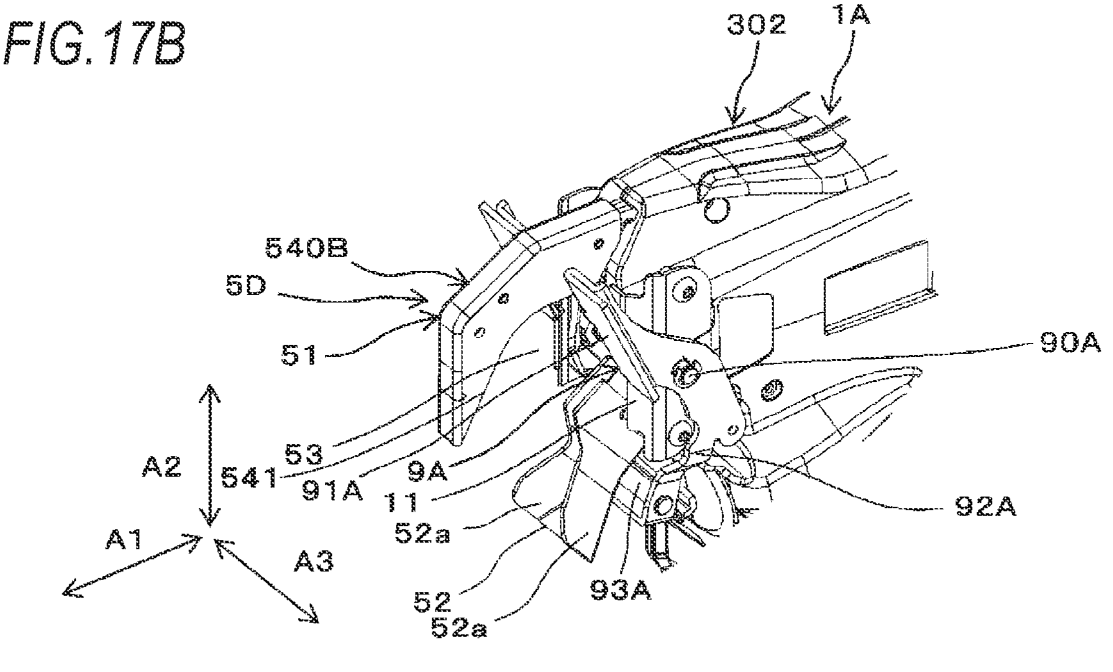
FIG. 17B is a perspective view depicting another modified embodiment of the guide part.

In FIGS. 17A and 17B, a guide cover part 540B has a locking portion 541 capable of correcting positions of the reinforcing bars, instead of the induction part 59. In a state where the guide cover part 540B is attached to the guide arm 51*d*, the locking portion 541 protrudes from the first guide 51 toward the second guide 52, and is configured to lock the wire W inserted in the insertion/pulling-out opening 53. Thereby, after locking the locking portion 541 to the wire W inserted in the insertion/pulling-out opening 53 and moving the locking portion in a direction of lifting the reinforcing bars S to correct positions of the reinforcing bars, it is possible to perform the binding operation of the reinforcing bars S.

<Example of Reinforcing Bar Binding Machine of Second Embodiment>

Figure 18:
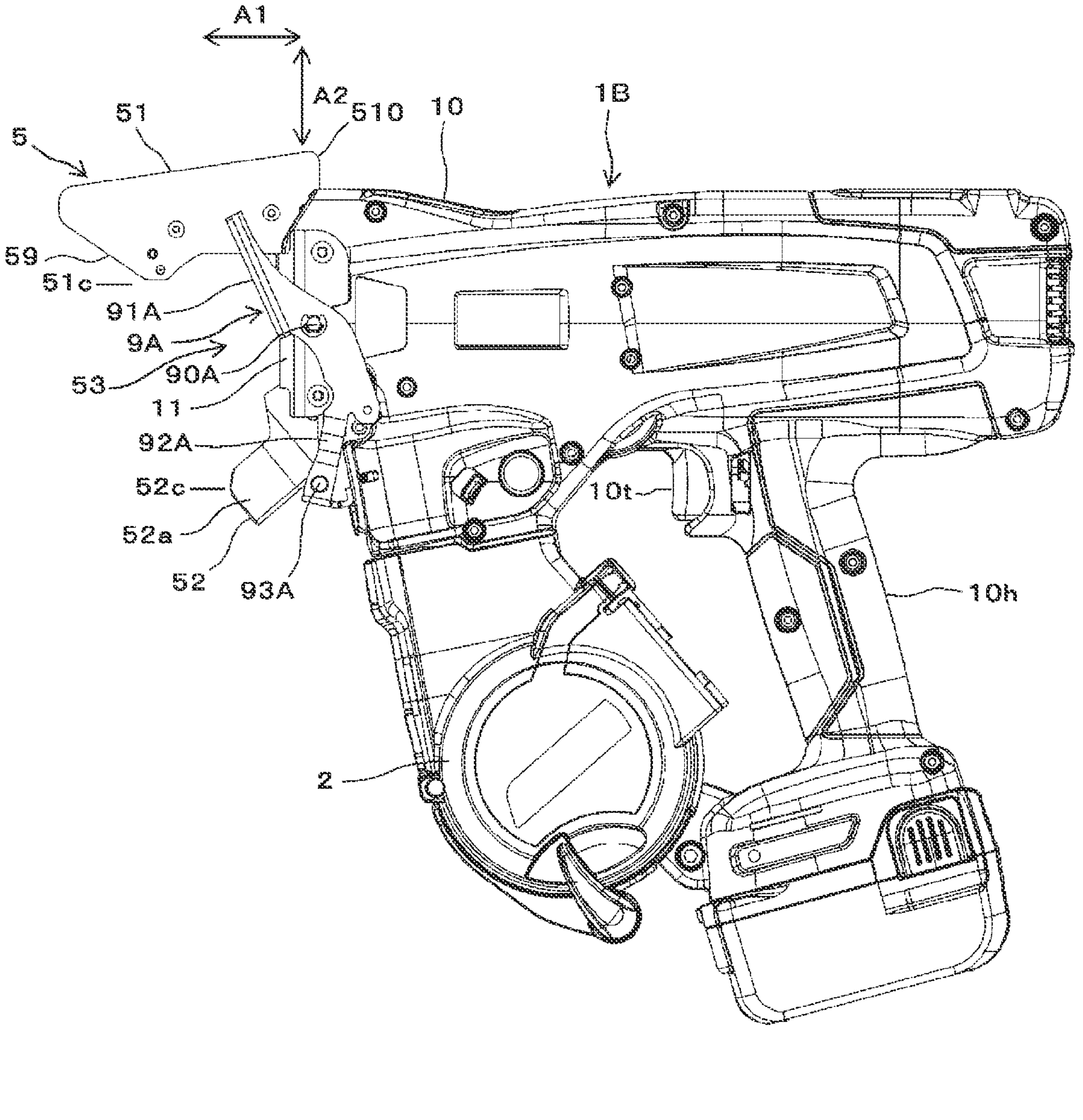
FIG. 18 is a side view depicting an example of an overall configuration of a reinforcing bar binding machine of a second embodiment.

FIG. 18 is a side view depicting an example of an overall configuration of a reinforcing bar binding machine of a second embodiment. A reinforcing bar binding machine 1B of the second embodiment is not an elongated shape and includes a handle part 10*h* protruding from a body part 10, and a trigger 10*t* configured to receive an operation of actuating the reinforcing bar binding machine 1B and provided on a front side of the handle part 10*h*. In the reinforcing bar binding machine 1B, the guide part 5 is provided on one side of the body part 10.

The guide part 5 has the induction part 59 configured to guide the reinforcing bars S to the insertion/pulling-out opening 53. The induction part 59 is provided on the tip end-side of a first guide 51, and is constituted by an inclined surface inclined in a direction in which an interval between the first guide 51 and the second guide 52 decreases, from a tip end toward a base end-side of the first guide 51. The other configurations are similar to the reinforcing bar binding machine 1A of the first embodiment.

The operator grips the handle part 10*h* of the reinforcing bar binding machine 1B, aligns a position of the guide part 5 with an intersection point of the two reinforcing bars S, and inserts the reinforcing bars S into the insertion/pulling-out opening 53.

The reinforcing bar binding machine 1B includes the visible part 510 for enabling a position of the guide part 5 to be visually recognized, so that it is possible to easily align the position of the first guide 51 with the intersection point of the reinforcing bars S while visually recognizing the visible part 510.

The reinforcing bar binding machine 1B also includes the induction part 59 provided on the tip end-side of the first guide 51 and having a shape of guiding the reinforcing bars S to the insertion/pulling-out opening 53. Thereby, when the induction part 59 of the first guide 51 is abutted against the reinforcing bars S, the first guide 51 can be guided in a direction in which the reinforcing bars S are inserted into the insertion/pulling-out opening 53.

According to the reinforcing bar binding machine 1B, in a state where the reinforcing bars S are not inserted in the insertion/pulling-out opening 53, the second guide 52 is moved to the first position, so that an interval between the end portion 52*c* of the second guide 52 and the end portion 51*c* of the first guide 51 increases. Thereby, the reinforcing bars S can be more easily inserted into the insertion/pulling-out opening 53.

The operator presses the reinforcing bars S against the contact parts 91A of the contact member 9A by moving the reinforcing bar binding machine 1B in the direction of inserting the reinforcing bars S into the insertion/pulling-out opening 53.

By the operation of moving the reinforcing bar binding machine 1B in the direction of inserting the reinforcing bars S into the insertion/pulling-out opening 53, the contact member 9A is applied with a force along the moving direction of the reinforcing bar binding machine 1B, so that the contact parts 91A are pushed. Thereby, the contact parts 91A are moved in the first direction denoted with the arrow A1, so that the contact member 9A rotates about the shaft 90A as a support point, thereby moving to the actuation position, in a similar manner described with reference to FIG. 10B.

The contact parts 91A of the contact member 9A are moved in the first direction denoted with the arrow A1 by the rotating operation about the shaft 90A as a support point. Thereby, the contact parts 91A can be pushed by the operation of moving the reinforcing bar binding machine 1B in the direction of inserting the reinforcing bars S into the insertion/pulling-out opening 53, and it is not necessary to move the reinforcing bar binding machine 1B in another direction so as to actuate the contact member 9A.

When the contact member 9A is moved to the actuation position, the rotation of the connecting part 92A about the shaft 90A as a support point causes the displacing part 93A to push the second guide 52 toward the first guide 51, so that the second guide 52 is moved to the second position.

When the second guide 52 is moved to the second position, the output of the second output unit 12A described with reference to FIG. 11 becomes on. In a state where the contact member 9A is moved to the actuation position and thus the output of the second output unit 12A becomes on, the reinforcing bars S are in a state where the reinforcing bars are within the feeding path Wf of the wire W shown with the broken line in FIG. 7 and are inserted to a bindable position. Thereby, the second output unit 12A can detect that the reinforcing bars S are inserted in the feeding path Wf of the wire W.

When the operator operates the trigger 10*t*, an output of a first output unit (not shown) becomes on. In a state where the reinforcing bars S are not pressed against the contact parts 91A of the contact member 9A, the contact member 9A is located at the standby position and an output of the second output unit 12A is off, even when the trigger 10*t* is operated and an output of the first output unit (not shown) becomes on, a series of operations of binding the reinforcing bars S with the wire W are not executed. In contrast, when the reinforcing bars S are pressed against the contact parts 91A of the contact member 9A, the contact member 9A is moved to the actuation position and the output of the second output unit 12A becomes on, in a state where the trigger 10*t* is operated and an output of the first output unit (not shown) becomes on, a series of operations of binding the reinforcing bars S with the wire W are executed. Alternatively, the operator operates the trigger 10*t* in a state where the reinforcing bars S are pressed against the contact parts 91A of the contact member 9A. The trigger 10*t* is operated, so that the output of the first output unit (not shown) becomes on and a series of operations of binding the reinforcing bars S with the wire W are executed.

<Example of Reinforcing Bar Binding Machine of Third Embodiment>

Figure 19A:
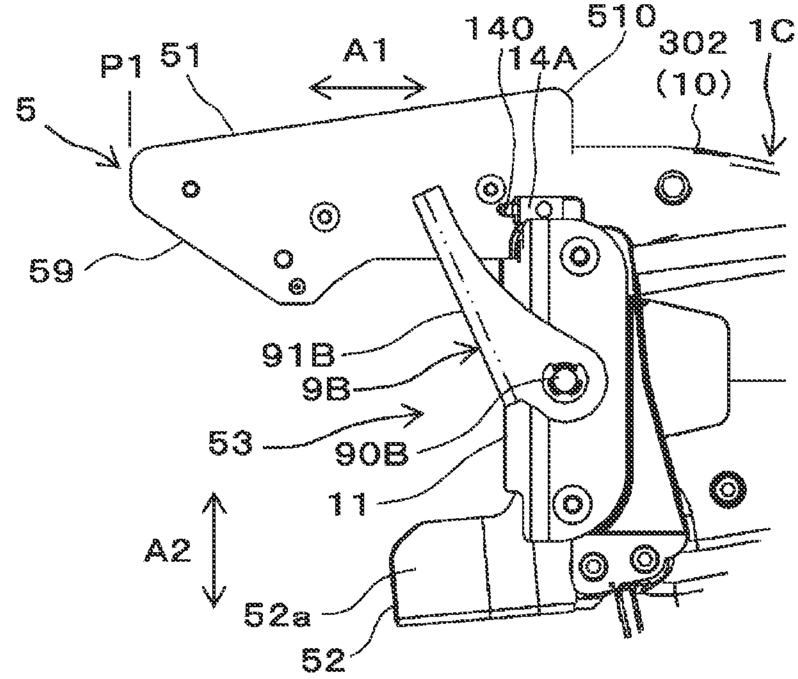
FIG. 19A is a side view depicting main parts of a reinforcing bar binding machine of a third embodiment.
Figure 19B:
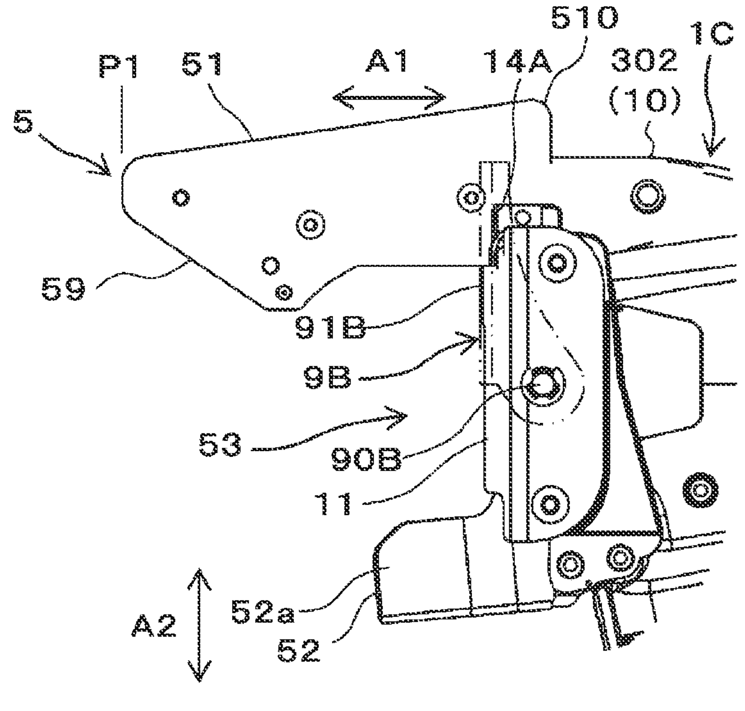
FIG. 19B is a side view depicting the main parts of the reinforcing bar binding machine of the third embodiment.

FIGS. 19A and 19B are side views depicting main parts of a reinforcing bar binding machine of a third embodiment.

A reinforcing bar binding machine 1C of the third embodiment has a configuration where the contact member and the second guide are not operated in association with each other, and is applied in an aspect where the first body part 301 and the second body part 302 are connected by the elongated connecting part 303, as described with reference to FIG. 1 and the like, or in an aspect where the handle part 10*h* protrudes from the body part 10, not the elongated shape, as described with reference to FIG. 18.

The reinforcing bar binding machine 1C includes the guide part 5 configured to guide a wire. The guide part 5 has the first guide 51 and the second guide 52. The first guide 51 and the second guide 52 are attached to the second body part 302 described with reference to FIG. 1 and the like or the end portion on the front side of the body part 10 described with reference to FIG. 18, and extend in the first direction denoted with the arrow A1. The second guide 52 is provided facing the first guide 51 in the second direction denoted with the arrow A2 orthogonal to the first direction. The second guide 52 may also be configured to be movable toward and away from the first guide 51 by rotation about a shaft (not shown). The guide part 5 has the induction part 59 configured to guide the reinforcing bars to the insertion/pulling-out opening 53. The induction part 59 is provided on the tip end-side of the first guide 51.

The first guide 51 has the visible part 510 for enabling a position of the guide part 5 to be visually recognized. The visible part 510 is provided on the base end-side of the first guide 51, and protrudes in the second direction from the second body part 302 toward an opposite direction to a side on which the second guide 52 is provided.

The reinforcing bar binding machine 1C includes a contact member 9B to which the reinforcing bars S are contacted. The contact member 9B is rotatable supported by a shaft 90B and is attached to the second body part 302 or the body part 10 via the cover part 11. The contact member 9B has contact parts 91B, which are contacted to the reinforcing bars S, on one side with respect to the shaft 90B. The contact parts 91B of the contact member 9B extend from the shaft 90B toward the first guide 51 in the second direction denoted with the arrow A2.

The contact member 9B has the shaft 90B provided adjacent to a center between the first guide 51 and the second guide 52. The contact member 9B also has a pair of contact parts 91B provided between the first guide 51 and the second guide 52 from the vicinity of a part supported by the shaft 90B toward the first guide 51-side. The contact parts 91B are provided with an interval, through which the wire W binding the reinforcing bars S can pass, on both sides in the third direction. The contact parts 91B extend to both left and right sides of the first guide 51.

The contact member 9B is configured to rotate about the shaft 90B as a support point, thereby moving between a standby position (FIG. 19A) at which the contact parts 91B protrude from the cover part 11 into the insertion/pulling-out opening 53 and an actuation position (FIG. 19B) at which the contact parts 91B come close to the cover part 11. The contact member 9B is urged in a moving direction to the standby position by an urging member (not shown), and is held at the standby position.

The reinforcing bar binding machine 1C includes a second output unit 14A configured to detect that the contact member 9B is moved to the actuation position. As shown in FIG. 19A, when the contact member 9B is moved to the standby position, the contact parts 91B of the contact member 9B are moved away from a movable element 140. In this way, in a state where the contact member 9B is moved to the standby position, an output of the second output unit 14A is set to an off state. In contrast, when the contact parts 91B are pressed against the reinforcing bars and the contact member 9B is thus moved to the actuation position, as shown in FIG. 19B, the contact parts 91B of the contact member 9B are moved in a direction of pushing the movable element 140. In this way, in a state where the contact member 9B is moved to the actuation position, an output of the second output unit 14A is set to an on state.

As described with reference to FIG. 1 and the like, in a case where the reinforcing bar binding machine is applied in such an aspect that the first body part 301 and the second body part 302 are connected by the elongated connecting part 303, when the contact member 9B is moved to the actuation position and it is thus detected that the output of the second output unit 14A becomes on, in a state where the operation part 304*t* is operated and it is thus detected that the output of the first output unit 15 becomes on, the control unit controls the feeding motor 31 and the twisting motor 80 to execute the series of operations of binding the reinforcing bars S with the wire W, as described above.

In addition, as described with reference to FIG. 18, in a case where the reinforcing bar binding machine is applied in such an aspect that the handle part 10*h* protrudes from the body part 10, not the elongated shape, when the reinforcing bars S are pressed against the contact parts 91B of the contact member 9B, so that the contact member 9B is moved to the actuation position and the output of the second output unit 14A becomes on, in a state where the trigger 10*t* is operated and an output of the output unit (not shown) becomes on, the series of operations of binding the reinforcing bars S with the wire W are executed.

Even in a configuration where the contact member and the second guide are not operated in association with each other, the visible part 510 for enabling the position of the guide part 5 to be visually recognized is provided, so that while visually recognizing the visible part 510, it is possible to easily align the position of the first guide 51 with the intersection point of the reinforcing bars S.

In addition, the induction part 59 having a shape capable of guiding the reinforcing bars S to the insertion/pulling-out opening 53 is provided on the tip end-side of the first guide 51, so that when the induction part 59 of the first guide 51 is butted against the reinforcing bars S, the first guide 51 can be guided in the direction in which the reinforcing bars S are inserted into the insertion/pulling-out opening 53.

<Example of Reinforcing Bar Binding Machine of Fourth Embodiment>

Figure 20:
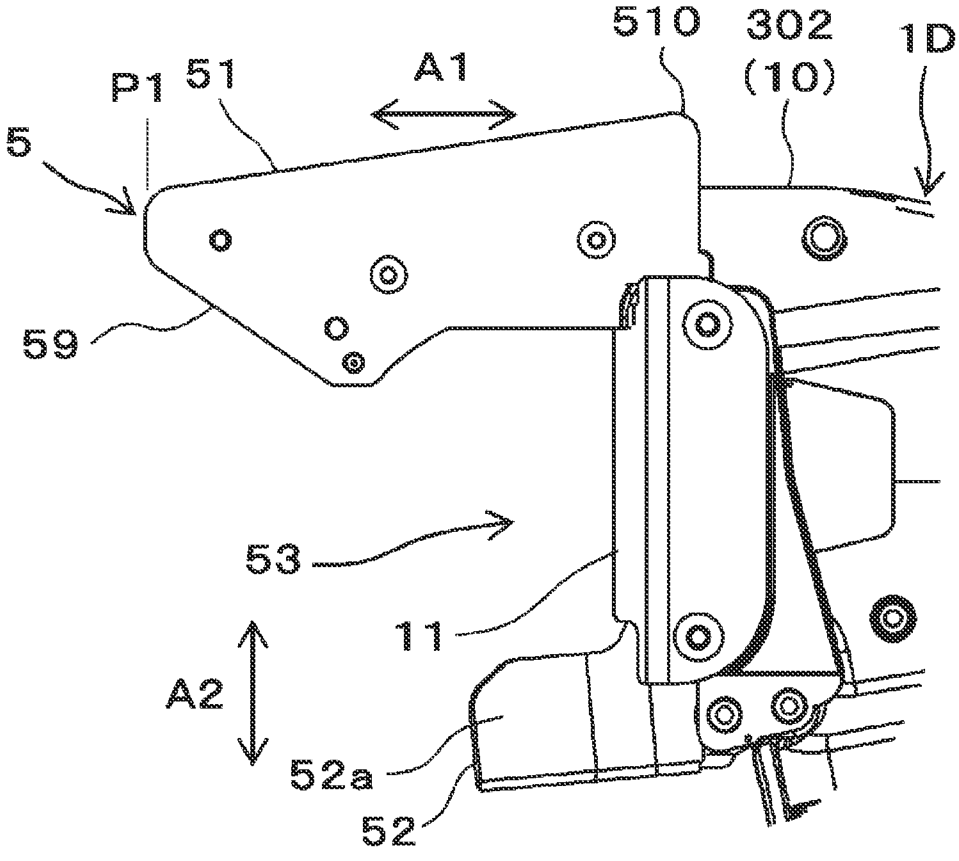
FIG. 20 is a side view depicting main parts of a reinforcing bar binding machine of a fourth embodiment.

FIG. 20 is a side view depicting main parts of a reinforcing bar binding machine of a fourth embodiment.

A reinforcing bar binding machine 1D of the fourth embodiment is not provided with the contact member, and is applied in such an aspect that the first body part 301 and the second body part 302 are connected by the elongated connecting part 303, as described with reference to FIG. 1 or is applied in such an aspect that the handle part 10*h* protrudes from the body part 10, not the elongated shape.

The reinforcing bar binding machine 1D includes the guide part 5 configured to guide a wire. The guide part 5 has the first guide 51 and the second guide 52. The first guide 51 and the second guide 52 are attached to the second body part 302 described with reference to FIG. 1 and the like or the end portion on the front side of the body part 10 described with reference to FIG. 18, and extend in the first direction denoted with the arrow A1. The second guide 52 is provided facing the first guide 51 in the second direction denoted with the arrow A2 orthogonal to the first direction. The second guide 52 may also be configured to be movable toward and away from the first guide 51 by rotation about a shaft (not shown). The guide part 5 has the induction part 59 configured to guide the reinforcing bars to the insertion/pulling-out opening 53. The induction part 59 is provided on the tip end-side of the first guide 51.

The first guide 51 has the visible part 510 for enabling a position of the guide part 5 to be visually recognized. The visible part 510 is provided on the base end-side of the first guide 51, and protrudes in the second direction from the second body part 302 toward an opposite direction to a side on which the second guide 52 is provided.

Even in a configuration where the contact member is not provided, the visible part 510 for enabling the position of the guide part 5 to be visually recognized is provided, so that while visually recognizing the visible part 510, it is possible to easily align the position of the first guide 51 with the intersection point of the reinforcing bars S.

In addition, the induction part 59 having a shape capable of guiding the reinforcing bars S to the insertion/pulling-out opening 53 is provided on the tip end-side of the first guide 51, so that when the induction part 59 of the first guide 51 is butted against the reinforcing bars S, the first guide 51 can be guided in the direction in which the reinforcing bars S are inserted into the insertion/pulling-out opening 53.

Note that, even in a configuration where the contact member is not provided, in a case where an obstacle such as a separate reinforcing bar and a wall surface exists on an inner side of the reinforcing bars S that is a binding object, when the tip end P1 of the first guide 51 collides with the obstacle, the reinforcing bars S that is a binding object cannot be contacted to the contact parts 91A of the contact member 9A. In contrast, when a length from the tip end P1 of the first guide 51 to the end portion P2 of the groove portion 51*h* on the tip end-side of the first guide 51 is equal to or larger than 10 mm and equal to or less than 30 mm, the tip end P1 of the first guide 51 is suppressed from colliding with the obstacle, so that the reinforcing bars S can be brought into contact with the cover part 11.

<Example of Reinforcing Bar Binding Machine of Fifth Embodiment>

Figure 21A:
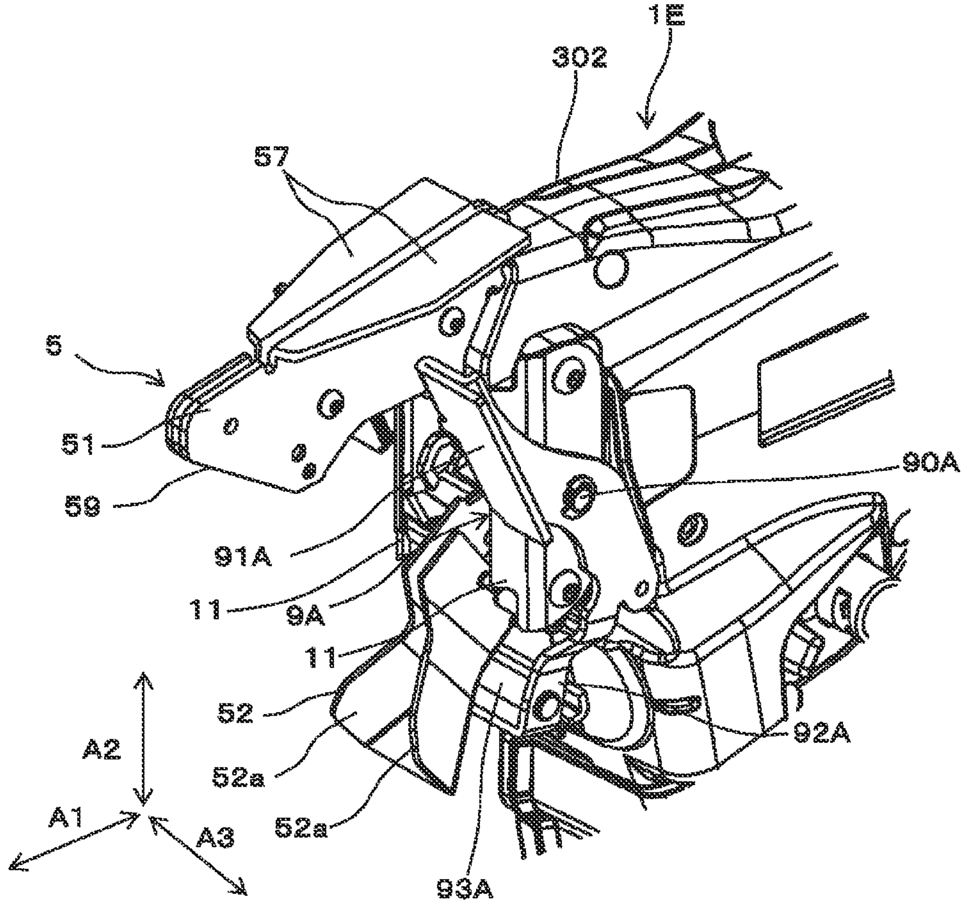
FIG. 21A is a side view depicting main parts of a reinforcing bar binding machine of a fourth embodiment.
Figure 21B:
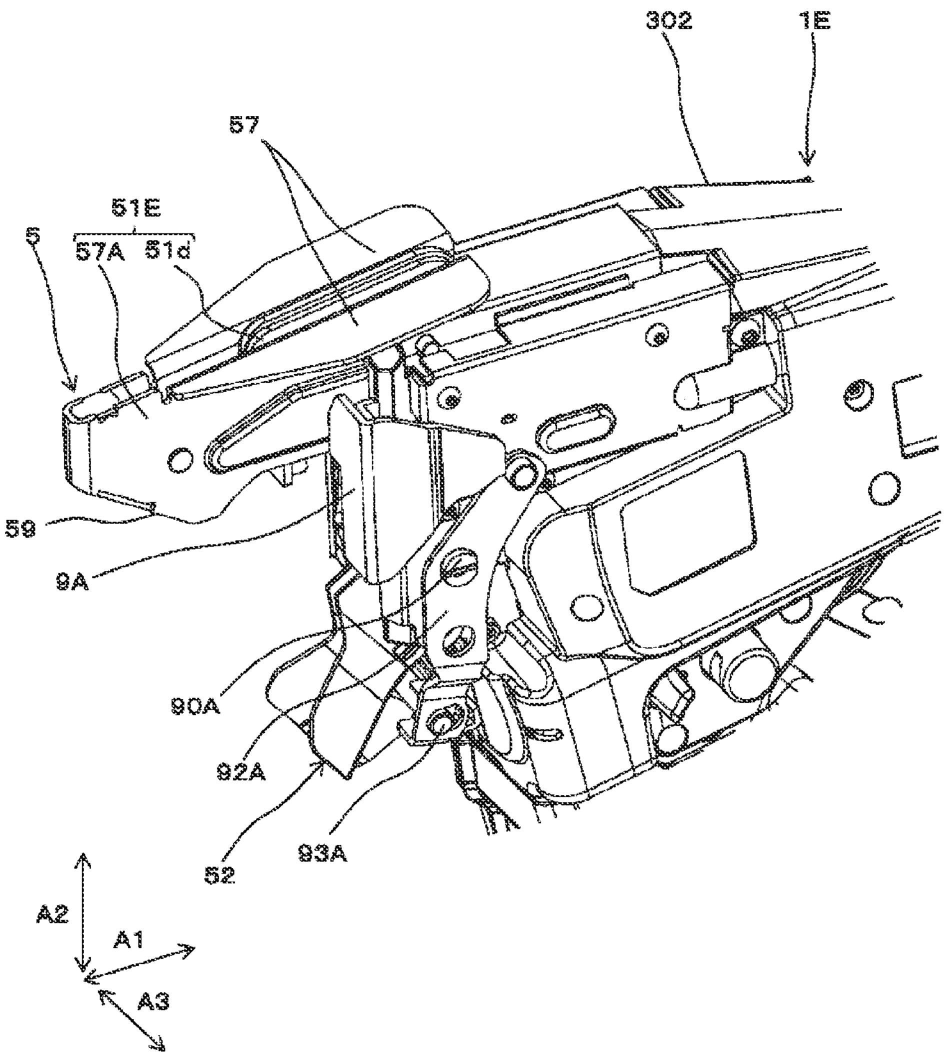
FIG. 21B is a side view depicting main parts of the reinforcing bar binding machine of the fourth embodiment.

FIGS. 21A and 21B are perspective views depicting main parts of a reinforcing bar binding machine of a fifth embodiment.

A reinforcing bar binding machine 1E of the fifth embodiment has protrusions 57 provided to the first guide 51; 51E of the guide part 5. The protrusions 57 are constituted by providing portions protruding laterally from the first guide 51; 51E in the third direction denoted with the arrow A3.

In FIG. 21A, the protrusions 57 are constituted by bending each of upper end portions of one side plate part and the other side plate part of the first guide 51 toward outer sides in the third direction. In FIG. 21B, the first guide 51E has the groove portion 51*h* having the guide surface 51*g* and the regulation member 43, and the guide arm 51*d* configured to guide the wire W is covered by a cover part 57A made of a metal plate. The protrusions 57 are constituted by bending each of an upper end portion of the cover part 57A covering one side part of the guide arm 51*d* and an upper end portion of the cover part 57A covering the other side part toward outer sides in the third direction. Note that, the protrusions 57 may also be constituted by providing an uneven shape to side parts of the first guide 51, the guide arm 51*d* or the cover part 57A.

The first guide 51 is likely to be butted against the reinforcing bars S during the operation of inserting the reinforcing bars S into the insertion/pulling-out opening 53. Therefore, the laterally protruding protrusions 57 are provided to the first guide 51, so that the rigidity of the first guide 51, particularly, the rigidity against a force of bending the first guide 51 in a plane direction along the third direction is improved. Thereby, the poor binding due to deformation of the first guide 51 can be suppressed. Also for the first guide 51E, similarly, the protrusions 57 laterally protruding from the cover part 57A are provided, so that the rigidity of the cover part 57A is improved. In addition, the guide arm 51*d* is reinforced by the cover part 57A, so that the entire rigidity of the first guide 51E is improved. Thereby, the poor binding due to deformation of the cover part 57A and the first guide 51E including the guide arm 51*d* can be suppressed.

The subject application is based on Japanese Patent Application Nos. 2018-168248 filed on Sep. 7, 2018 and 2019-156057 filed on Aug. 28, 2019, the contents of which are incorporated herein by reference.

REFERENCE SIGNS LIST

1A, 1B, IC, 1D, 1E . . . reinforcing bar binding machine, 10 . . . body part, 10*h* . . . handle part, 10*t* . . . trigger, 11 . . . cover part, 12A, 14A . . . second output unit, 120 . . . movable element, 15 . . . first output unit, 2 . . . accommodation part, 20 . . . wire reel, 3 . . . feeding unit, 30 . . . feeding gears, 31 . . . feeding motor, 4 . . . regulation part, 42 . . . regulation member, 43 . . . regulation member, 44 . . . transmission mechanism, 5, 5B, 5C, 5D . . . guide part, 51, 51E . . . first guide, 51*d* . . . guide arm, 51*g* . . . guide surface, 51*h* . . . groove portion, P2 . . . end portion , 51*c* . . . end portion, 52 . . . second guide, 52*a* . . . side guide, 52*b* . . . shaft, 52*c* . . . end portion, 53 . . . insertion/pulling-out opening, 54 . . . urging member, 57 . . . protrusion, 57A . . . cover part, 59 . . . induction part (first induction part), 59B, 59C . . . induction part (second induction part), 510, 511 . . . visible part (first visible part), 512A, 512B . . . visible part (second visible part), 520, 521 . . . third guide, 540, 540B . . . guide cover part, 541 . . . locking portion, 6 . . . cutting unit, 60 . . . fixed blade part, 60*a* . . . opening, 61 . . . movable blade part, 62 . . . transmission mechanism, 7 . . . twisting unit, 70 . . . engaging part, 71 . . . actuation part, 8 . . . drive unit, 80 . . . twisting motor, 81 . . . decelerator, 82 . . . rotary shaft, 83 . . . movable member, 9A, 9B . . . contact member, 90A, 90B . . . shaft, 91A, 91B . . . contact part, 92A . . . connecting part, 93A . . . displacing part, 100A . . . control unit, 301 . . . first body part, 302 . . . second body part, 303 . . . connecting part, 304*h* . . . handle part, 304L, 304R . . . grip part, 304*t* . . . operation part, W . . . wire

The invention claimed is:

1. A binding machine comprising:

a body part;

a feeding unit configured to feed a wire;

a first guide extending in a first direction from an end portion on one side of the body part, configured to guide the wire fed by the feeding unit, and having a first induction part for inducting a binding object provided on a tip end-side in the first direction;

a second guide spaced from the first guide with an interval, in which the binding object is inserted, in a second direction orthogonal to the first direction, and configured to guide the wire fed by the feeding unit; and a twisting unit configured to twist the wire guided by the first guide and the second guide, wherein the first induction part is constituted by a surface inclined in a direction in which the interval between the first guide and the second guide decreases from a tip end-side toward a base end-side of the first induction part in the first direction, wherein the first guide includes a groove having a guide surface with which the wire is in sliding contact and a regulation member configured to curl the wire, wherein a part of the regulation member protrudes toward the guide surface, wherein the entirety of the first induction part is provided on a further tip end-side than an end portion of the groove on the tip end-side of the first guide, wherein an inclination angle of the first induction part relative to an axis line of the twisting unit is equal to or larger than 6° and equal to or smaller than 45°, and wherein the first guide comprises a guide arm configured to guide the wire fed by the feeding unit, and wherein the first induction part is detachably mounted to the guide arm.

2. The binding machine according to claim 1, wherein a length of the first guide in the first direction is equal to or smaller than 110 mm.

3. The binding machine according to claim 1, further comprising a first visible part for enabling a position of the first guide to be visually recognized via the body part from an opposite side to the first guide.

4. The binding machine according to claim 3, wherein the first visible part protrudes further outward than an outer shape of the body part.

5. The binding machine according to claim 4, wherein the first visible part is provided on a base end-side of the first guide and protrudes in the second direction.

6. The binding machine according to claim 1, further comprising a second visible part capable of aligning a direction of the first guide with respect to the binding object.

7. The binding machine according to claim 1, further comprising a second induction part positioned on a side on which the second guide is provided, and configured to guide the binding object between the first guide and the second guide.

8. The binding machine according to claim 7, further comprising a third guide provided on a tip end-side of the second guide, wherein the second induction part is provided to the third guide.

9. The binding machine according to claim 8, wherein the second induction part is constituted by providing a surface along which an interval between the third guide and the first guide decreases from a tip end of the third guide toward the tip end-side of the second guide.

10. The binding machine according to claim 1, wherein the first guide comprises a protrusion protruding in a third direction orthogonal to the first direction and the second direction.

11. The binding machine according to claim 10, wherein the first guide comprises a guide arm configured to guide the wire fed by the feeding unit, and a cover part configured to cover the guide arm, and wherein the cover part is provided with the protrusion.

* * * * *